United States Patent
Sun et al.

(10) Patent No.: US 12,308,675 B2
(45) Date of Patent: May 20, 2025

(54) POWER SUPPLY SYSTEM AND METHOD FOR TERMINAL DEVICE, CHIP, AND TERMINAL DEVICE

(71) Applicant: Huawei Technologies Co., Ltd., Shenzhen (CN)

(72) Inventors: Ni Sun, Shenzhen (CN); Chunjiang Zhao, Shenzhen (CN); Chengxu Zhang, Shenzhen (CN); Jianwei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 626 days.

(21) Appl. No.: 17/627,483

(22) PCT Filed: Jul. 16, 2020

(86) PCT No.: PCT/CN2020/102266
§ 371 (c)(1),
(2) Date: Jan. 14, 2022

(87) PCT Pub. No.: WO2021/008572
PCT Pub. Date: Jan. 21, 2021

(65) Prior Publication Data
US 2022/0263324 A1    Aug. 18, 2022

(30) Foreign Application Priority Data
Jul. 18, 2019  (CN) .......................... 201910651651.X

(51) Int. Cl.
*H02J 7/00*         (2006.01)
(52) U.S. Cl.
CPC .......... *H02J 7/0024* (2013.01); *H02J 7/0016* (2013.01); *H02J 7/0048* (2020.01); *H02J 7/007182* (2020.01); *H02J 7/007194* (2020.01)

(58) Field of Classification Search
CPC ...... H02J 7/0024; H02J 7/0016; H02J 7/0048; H02J 7/007182; H02J 7/007194
(Continued)

(56) References Cited

U.S. PATENT DOCUMENTS 5,814,972 A * 9/1998 Shimada ................... H02J 1/10
320/135
2015/0194835 A1   7/2015 Wiebe
(Continued)

FOREIGN PATENT DOCUMENTS

| CN | 102624065 A | 8/2012 |
| CN | 106026249 A | 10/2016 |

(Continued)

*Primary Examiner* — Zixuan Zhou
(74) *Attorney, Agent, or Firm* — Slater Matsil, LLP

(57) ABSTRACT

This application provides a power supply system for a terminal device, and a chip, and relates to the charging field. The power supply system includes a battery pack, a bypass circuit, a voltage step-down circuit, and a controller. The battery pack includes at least two batteries. The controller is configured to: when the batteries in the battery pack need to be switched to a series mode, control the voltage step-down circuit to work and control the bypass circuit to stop working, and is further configured to: when the batteries in the battery pack need to be switched to a parallel mode, control the bypass circuit to work and control the voltage step-down circuit to stop working. In the system, switching between the series mode and the parallel mode can be automatically implemented based on an actual situation, so that endurance and stability of the terminal device are improved.

19 Claims, 24 Drawing Sheets

(58) Field of Classification Search
USPC .......................................... 320/116–117, 126
See application file for complete search history.

(56) References Cited

U.S. PATENT DOCUMENTS

| | | | |
|---|---|---|---|
| 2015/0380930 A1* | 12/2015 | Smith ....................... | G05F 1/46 |
| | | | 307/24 |
| 2016/0313783 A1 | 10/2016 | Li et al. | |
| 2017/0187184 A1* | 6/2017 | Nakayama ............ | H02J 7/0024 |
| 2021/0159709 A1* | 5/2021 | Kim ....................... | H02J 7/0013 |
| 2022/0140621 A1* | 5/2022 | Kwon ................. | H02J 7/00714 |
| | | | 320/117 |

FOREIGN PATENT DOCUMENTS

| | | |
|---|---|---|
| CN | 110021973 A | 7/2019 |
| CN | 110429673 A | 11/2019 |

* cited by examiner

POWER SUPPLY SYSTEM AND METHOD FOR TERMINAL DEVICE, CHIP, AND TERMINAL DEVICE

CROSS-REFERENCE TO RELATED APPLICATIONS

This application is a national stage of International Application No. PCT/CN2020/102266, filed on Jul. 16, 2020, which claims priority to Chinese Patent Application No. 201910651651.X, filed on Jul. 18, 2019. Both of the aforementioned applications are hereby incorporated by reference in their entireties.

TECHNICAL FIELD

This application relates to the technical field of terminal devices, and in particular, to a power supply system and method for a terminal device, a chip, and a terminal device.

BACKGROUND

With popularization of technologies, a plurality of batteries are used in battery packs of increasingly more terminal devices to supply power. When the battery pack of the terminal device includes a plurality of batteries, the battery pack usually uses a parallel mode.

When the battery pack uses the parallel mode, positive electrodes of the plurality of batteries are connected to each other, negative electrodes are connected to each other, and output voltages of the batteries in the battery pack are the same and are equal to an output voltage of the battery pack. However, because the battery has internal resistance and the internal resistance of the battery increases with a temperature decrease of the battery, when ambient temperature is low, battery temperature is correspondingly low, and the internal resistance of the battery is increased. Consequently, an output voltage of the battery decreases, and a terminal device is prone to shut down.

Therefore, when the battery pack uses the parallel mode, stability of the terminal device may be reduced.

SUMMARY

Technical solutions of this application provide a power supply system and method for a terminal device, a chip, and a terminal device, so that switching between a series mode and a parallel mode can be implemented, and endurance can be increased while stability of the terminal device is improved.

According to a first aspect, the technical solutions of this application provide a power supply system for a terminal device. The system includes a battery pack, a bypass circuit, a voltage step-down circuit, and a controller. The battery pack includes at least two batteries. An output end of the battery pack is connected to an input end of the voltage step-down circuit, an output end of the voltage step-down circuit is connected to a power consumption element of the terminal device, one end of the bypass circuit is connected to the input end of the voltage step-down circuit, and the other end of the bypass circuit is connected to the output end of the voltage step-down circuit. The controller is configured to: when the batteries in the battery pack need to be switched to a series mode, control the voltage step-down circuit to work and control the bypass circuit to stop working, and is further configured to: when the batteries in the battery pack need to be switched to a parallel mode, control the bypass circuit to work and control the voltage step-down circuit to stop working.

The controller in the system may perform switching between the series mode and the parallel mode. When the battery pack is switched to the series mode, an output voltage can be improved, so that the terminal device is prevented from being shut down due to insufficient power supply, and stability when a user uses the terminal device can be improved. When the battery pack is switched to the parallel mode, the voltage step-down circuit may not need to be used. Therefore, discharge efficiency of the battery pack can be improved, an endurance capability of the battery can be increased, and user experience can be improved.

With reference to the first aspect, in a first possible implementation, that the controller is configured to control the voltage step-down circuit to work and control the bypass circuit to stop working includes: when the controller determines that an output voltage of the battery pack is greater than or equal to a first preset threshold voltage, controlling the voltage step-down circuit to work, and controlling the bypass circuit to stop working.

The first preset threshold voltage may be greater than a maximum output voltage of the battery pack in the parallel mode and less than a minimum output voltage of the battery pack in the series mode. The controller compares the output voltage of the battery pack with the first preset threshold voltage, to determine working statuses of the bypass circuit and the voltage step-down circuit.

With reference to the first aspect and any one of the foregoing possible implementations, in a second possible implementation, the controller is further configured to: when determining that a voltage between two ends of the power consumption element is less than a second preset voltage threshold, determine that the batteries in the battery pack need to be switched to the series mode.

The controller may determine the voltage between the two ends of the power consumption element based on a current output voltage of the battery pack, a current flowing through the power consumption element, and impedance of each circuit component. The second preset voltage threshold may be set to a shutdown threshold voltage of the terminal device. When the voltage between two ends of the power consumption element is less than or equal to the second preset voltage threshold, it indicates that a current voltage output capability of the parallel mode is insufficient to support normal working of the power consumption element, and the batteries in the battery pack need to be switched to the series mode.

With reference to the first aspect and either of the foregoing possible implementations, in a third possible implementation, the controller is further configured to determine, based on an output voltage of the battery pack and temperature of the battery pack, that the batteries in the battery pack need to be switched to the series mode. The output voltage of the battery pack may be obtained through ADC sampling. The controller may obtain, by detecting a resistance value of a thermistor, temperature corresponding to the resistance value, to determine battery temperature.

With reference to the first aspect and any one of the foregoing possible implementations, in a fourth possible implementation, the controller is further configured to determine, based on the output voltage of the battery pack and the temperature of the battery pack by searching a table, that the batteries in the battery pack need to be switched to the series mode. Output voltages and temperature statuses recorded in the table may be non-exhaustive, to reduce occupation of storage space of the terminal device. The output voltage and the temperature status correspondingly form a status point. An actually measured output voltage and actually measured temperature of the battery pack may be rounded to a nearest defined status point.

With reference to the first aspect and any one of the foregoing possible implementations, in a fifth possible implementation, the controller selects, based on a load current, a table corresponding to the load current, where when the load current is greater than a preset current, the load current is in a heavy-load scenario, and a heavy-load table is correspondingly used in this case, and when the load current is less than or equal to the preset current, the load current is in a light-load scenario, and a light-load table is correspondingly used in this case. The controller may measure a voltage between two ends of a current sense resistor of a discharge path in real time, and a ratio of the voltage between the two ends of the current sense resistor to impedance of the current sense resistor is the load current. After obtaining a corresponding table, the controller determines, based on the output voltage of the battery pack and the temperature of the battery pack by searching the table, a working mode required by the batteries in the battery pack in this scenario.

In a scenario of low temperature, a low voltage, and heavy load, the series mode may be preferentially used, to prevent the device from being abnormally shut down. In a scenario of light load, the parallel mode may be used to increase standby time of the device.

With reference to the first aspect and any one of the foregoing possible implementations, in a sixth possible implementation, the controller is further configured to: obtain a corresponding value based on the output voltage of the battery pack and the temperature of the battery pack, and when the value is less than or equal to a preset value, determine that the batteries in the battery pack need to be switched to the series mode.

In this implementation, occupation of storage space of the terminal device can be reduced during determining of a working mode in which the battery pack needs to be.

With reference to the first aspect and any one of the foregoing possible implementations, in a seventh possible implementation, the controller is configured to: obtain a function value based on the output voltage of the battery pack and the temperature of the battery pack by using a preset function, use the preset function as the value, and when the function value is less than or equal to the preset value, determine that the batteries in the battery pack need to be switched to the series mode, where the function value of the preset function is positively correlated to the temperature of the battery pack, and the function value of the preset function is positively correlated to the output voltage of the battery pack.

For example, the preset value represents a threshold voltage for switching between the series mode and the parallel mode at ° C. When the function value is greater than the preset value, the battery pack needs to be in the parallel mode. When the function value is less than or equal to the preset value, the battery pack needs to be in the series mode. A factor that affects the preset value may be a low-temperature discharge capability of a used battery, and a stronger low-temperature discharge capability of the used battery may lead to a smaller preset value.

The controller is further configured to select the preset value based on the load current. A case in which the load current is greater than the preset current corresponds to the heavy-load scenario, and in this case, corresponds to a first preset value. A case in which the load current is less than or equal to the preset current corresponds to the light-load scenario, and in this case, corresponds to a second preset value. When the first preset value is less than the second preset value, it indicates that in the light-load scenario, the parallel mode is preferentially used, to increase standby time of the device.

With reference to the first aspect and any one of the foregoing possible implementations, in an eighth possible implementation, the controller is further configured to: when determining that a low-temperature mode button is triggered, determine that the batteries in the battery pack need to be switched to the series mode.

It may be understood that the low-temperature mode button may be a virtual button, or may be a physical button.

A "low-temperature mode" may be added to a control interface of the terminal device. In response to triggering of the user, the terminal device enters the low-temperature mode, and the battery pack is switched to the series mode. When the user exits the "low-temperature mode", the power supply system is switched to an automatic mode, and the controller in the power supply system automatically selects a most appropriate working mode.

With reference to the first aspect and any one of the foregoing possible implementations, in a ninth possible implementation, the controller is further configured to: when determining that a battery level of the battery pack is less than a preset battery level or determining that a low-power mode button is triggered, determine that the batteries in the battery pack need to be switched to the series mode.

It may be understood that the low-power mode button may be a virtual button, or may be a physical button.

A "low-power mode" button may be added to the control interface of the terminal device, so that the user can actively choose to enter the "low-power mode". A button "allow the terminal device to automatically enter the low-power mode" may be further added to the terminal device, so that the user can allow the terminal device to automatically enter the low-power mode.

Further, the "low-temperature mode" and the "low-power mode" may be simultaneously selected by the user, for example, the foregoing two modes are simultaneously set in the control interface of the terminal device.

With reference to the first aspect and any one of the foregoing possible implementations, in a tenth possible implementation, the bypass circuit includes any one of the following switching components: a transistor, a relay, a load switch, and a metal-oxide semiconductor field-effect transistor, and the voltage step-down circuit includes any one of the following: a buck circuit, a switched capacitor (switched capacitor), a three-level direct current-direct current circuit, and a single-ended primary-inductor converter (single ended primary inductor converter).

With reference to the first aspect and any one of the foregoing possible implementations, in an eleventh possible implementation, the battery pack includes at least two batteries: a first battery and a second battery, and the battery pack further includes a first switching transistor, a second switching transistor, and a third switching transistor. A positive electrode of the first battery is connected to the input end of the voltage step-down circuit; a negative electrode of the first battery is connected to a positive electrode of the second battery by using the second switching transistor, and a negative electrode of the second battery is grounded; one end of the first switching transistor is connected to the negative electrode of the first battery, and another end of the first switching transistor is grounded; one end of the third switching transistor is connected to the input end of the voltage step-down circuit, and another end of the third switching transistor is connected to the positive electrode of the second battery; and when the batteries need to be switched to the series mode, the controller controls the first switching transistor and the third switching transistor to be disconnected and controls the second switching transistor to be closed; and when the batteries need to be switched to the parallel mode, the controller controls the second switching transistor to be disconnected and controls the first switching transistor and the third switching transistor to be closed.

The controller controls the first switching transistor, the second switching transistor, and the third switching transistor to be in different on/off combination states, to implement switching between a serial connection and a parallel connection of the batteries in the battery pack.

With reference to the first aspect and any one of the foregoing possible implementations, in a twelfth possible implementation, the power supply system further includes a first capacitor. A first end of the first capacitor is connected to the output end of the battery pack, and a second end of the first capacitor is grounded. That when the batteries need to be switched to the series mode, the controller controls the first switching transistor and the third switching transistor to be disconnected and controls the second switching transistor to be closed includes: when the batteries need to be switched to the series mode, the controller controls all the first switching transistor, the second switching transistor, and the third switching transistor to be disconnected, and controls, after first preset time, the second switching transistor to be closed.

The first capacitor may be used for voltage stabilization and filtering, to improve power supply quality. A length of the first preset time is greater than a length of dead time of the switching transistor, and setting the first preset time can prevent a short circuit between a positive electrode and a negative electrode of a battery cell in a switching process.

With reference to the first aspect and any one of the foregoing possible implementations, in a thirteenth possible implementation, the power supply system further includes a second capacitor. A first end of the second capacitor is connected to the output end of the voltage step-down circuit, and a second end of the second capacitor is grounded.

The second capacitor may be used for voltage stabilization and filtering, to improve power supply quality. The first capacitor and the second capacitor may be configured to maintain a relatively stable output voltage of the power supply system in the dead time.

With reference to the first aspect and any one of the foregoing possible implementations, in a fourteenth possible implementation, that when the batteries need to be switched to the parallel mode, the controller controls the bypass circuit to work and the voltage step-down circuit to stop working and that when the batteries need to be switched to the parallel mode, the controller controls the second switching transistor to be disconnected and controls the first switching transistor and the third switching transistor to be closed include: when the batteries need to be switched to the parallel mode, the controller controls all the first switching transistor, the second switching transistor, and the third switching transistor to be disconnected, the controller controls, after second preset time, the first switching transistor and the third switching transistor to be closed, and the controller controls, after third preset time, the bypass circuit to work and the voltage step-down circuit to stop working. To avoid a short circuit between a positive electrode and a negative electrode of the battery in a switching process, the battery pack needs to be first controlled to be switched to the series mode, and then the bypass circuit can be controlled to work and the voltage step-down circuit can be controlled to stop working. Therefore, when the third preset time is greater than the dead time of the switching transistor, it can be ensured that when the controller controls switching of the voltage step-down circuit and the bypass circuit, the first switching transistor and the third switching transistor are already in an on state.

With reference to the first aspect and any one of the foregoing possible implementations, in a fifteenth possible implementation, that the controller controls, after second preset time, the first switching transistor and the third switching transistor to be closed includes: when the controller determines that a voltage of the first battery is greater than a voltage of the second battery, the controller controls, after the second preset time, the first switching transistor to be closed, and the controller controls, after fourth preset time, the third switching transistor to be closed; or when the controller determines that a voltage of the first battery is less than a voltage of the second battery, the controller controls, after the second preset time, the third switching transistor to be closed, and the controller controls, after fourth preset time, the first switching transistor to be closed; or when the controller determines that a voltage of the first battery is equal to a voltage of the second battery, the controller controls, after the second preset time, the first switching transistor and the third switching transistor to be closed.

The fourth preset time may be referred to as balance time, and may be time of voltage balancing between the batteries in a process in which the battery pack is switched from the series mode to the parallel mode. Because the controller controls a high-voltage battery to be switched first to supply power, and a low-voltage battery later to be switched later to supply power, a voltage difference between the batteries is reduced, and therefore, a surge current between the batteries can be reduced.

According to a second aspect, the technical solutions of this application provide a chip, and the chip includes a bypass circuit and a voltage step-down circuit. An input end of the voltage step-down circuit is connected to an output end of a battery pack, an output end of the voltage step-down circuit is connected to a power consumption element of a terminal device, one end of the bypass circuit is connected to the input end of the voltage step-down circuit, and the other end of the bypass circuit is connected to the output end of the voltage step-down circuit. Both the bypass circuit and the voltage step-down circuit are connected to a controller of the terminal device, and when batteries in the battery pack need to be switched to a series mode, in response to a control signal of the controller, the voltage step-down circuit works, and the bypass circuit stops working, or when batteries in the battery pack are in a parallel mode, in response to a control signal of the controller, the bypass circuit works, and the voltage step-down circuit stops working.

Based on the foregoing descriptions, the chip includes both the voltage step-down circuit and the bypass circuit. When a power supply system uses the chip, a size of a hardware device can be reduced, and costs can be reduced.

According to a third aspect, the technical solutions of this application provide a power supply method for a terminal device, where the power supply method is applied to a power supply system for the terminal device, and the power supply system includes a battery pack, a bypass circuit, a voltage step-down circuit, and a controller. The battery pack includes at least two batteries. An output end of a battery pack is connected to an input end of the voltage step-down circuit, and an output end of the voltage step-down circuit is connected to a power consumption element of the terminal device. One end of the bypass circuit is connected to the input end of the voltage step-down circuit, and the other end of the bypass circuit is connected to the output end of the voltage step-down circuit. When the batteries in the battery pack are in a series mode, the voltage step-down circuit is controlled to work, and the bypass circuit is controlled to stop working, and when the batteries in the battery pack are in a parallel mode, the bypass circuit is controlled to work, and the voltage step-down circuit is controlled to stop working.

In the method, the batteries in the battery pack may be controlled to be switched between the series mode and the parallel mode. When the battery pack is switched to the series mode, an output voltage can be improved, so that the terminal device is prevented from being shut down due to insufficient power supply, and stability when a user uses the terminal device can be improved. When the battery pack is switched to the parallel mode, the voltage step-down circuit may not need to be used. Therefore, discharge efficiency of the battery pack can be improved, an endurance capability of the battery can be increased, and user experience can be improved.

With reference to the third aspect, in a first possible implementation, the method further includes: determining, based on an output voltage of the battery pack and temperature of the battery pack, that the batteries in the battery pack need to be switched to the series mode. The output voltage of the battery pack may be obtained through ADC sampling. A resistance value of a thermistor is detected to obtain temperature corresponding to the resistance value, to determine current battery temperature.

With reference to the third aspect and any one of the foregoing possible implementations, in a second possible implementation, the determining, based on an output voltage of the battery pack and temperature of the battery pack, that the batteries in the battery pack need to be switched to the series mode includes:

determining, based on the output voltage of the battery pack and the temperature of the battery pack by searching a table, that the batteries in the battery pack need to be switched to the series mode. Output voltages and temperature statuses recorded in the table may be non-exhaustive, to reduce occupation of storage space of the terminal device. The output voltage and the temperature status correspondingly form a status point. An actually measured output voltage and actually measured temperature of the battery pack may be rounded to a nearest defined status point.

With reference to the third aspect and any one of the foregoing possible implementations, in a third possible implementation, the method further includes: selecting, based on a load current, a table corresponding to the load current, where when the load current is greater than a preset current, the load current is in a heavy-load scenario, and a heavy-load table is correspondingly used in this case, and when the load current is less than or equal to the preset current, the load current is in a light-load scenario, and a light-load table is correspondingly used in this case.

In this manner, a combination of load, the output voltage of the battery pack, and the battery temperature is used as a criterion. In a scenario of low temperature, a low voltage, and heavy load, the series mode is preferentially used, to prevent the device from being abnormally shut down. In a scenario of light load, the parallel mode is preferentially used, to increase standby time of the device.

With reference to the third aspect and any one of the foregoing possible implementations, in a fourth possible implementation, the method further includes: when it is determined that a voltage between two ends of the power consumption element is less than a second preset voltage threshold, determining that the batteries in the battery pack need to be switched to the series mode. The voltage between two ends of the power consumption element may be determined based on a current output voltage of the battery pack, a current flowing through the power consumption element, and impedance of each circuit component. The second preset voltage threshold may be set to a shutdown threshold voltage of the terminal device. When the voltage between two ends of the power consumption element is less than or equal to the second preset voltage threshold, it indicates that a current voltage output capability of the parallel mode is insufficient to support normal working of the power consumption element, and the batteries in the battery pack need to be switched to the series mode.

With reference to the third aspect and any one of the foregoing possible implementations, in a fifth possible implementation, the method further includes: obtaining a corresponding value based on the output voltage of the battery pack and the temperature of the battery pack, and when the value is less than or equal to a preset value, determining that the batteries in the battery pack need to be switched to the series mode. In the method, occupation of storage space of the terminal device can be reduced during determining of a working mode in which the battery pack needs to be.

With reference to the third aspect and any one of the foregoing possible implementations, in a sixth possible implementation, the method further includes: obtaining a function value based on the output voltage of the battery pack and the temperature of the battery pack by using a preset function, using the preset function as the value, and when the function value is less than or equal to the preset value, determining that the batteries in the battery pack need to be switched to the series mode, where the function value of the preset function is positively correlated to the temperature of the battery pack, and the function value of the preset function is positively correlated to the output voltage of the battery pack. The preset value is selected based on the load current. A case in which the load current is greater than the preset current corresponds to the heavy-load scenario, and in this case, corresponds to a first preset value. A case in which the load current is less than or equal to the preset current corresponds to the light-load scenario, and in this case, corresponds to a second preset value. When the first preset value is less than the second preset value, it indicates that in the light-load scenario, the parallel mode is preferentially used, to increase standby time of the device.

With reference to the third aspect and any one of the foregoing possible implementations, in a seventh possible implementation, the method further includes: when it is determined that a low-temperature mode button is triggered, determining that the batteries in the battery pack need to be switched to the series mode. A "low-temperature mode" may be added to a control interface of the terminal device. In response to triggering of the user, the terminal device enters the low-temperature mode, and the battery pack is switched to the series mode.

With reference to the third aspect and any one of the foregoing possible implementations, in an eighth possible implementation, the method further includes: when it is determined that a battery level of the battery pack is less than a preset battery level or it is determined that a low-power mode button is triggered, determining that the batteries in the battery pack need to be switched to the series mode. A "low-power mode" button may be added to the control interface of the terminal device, so that the user can actively choose to enter the "low-power mode". A button "allow the terminal device to automatically enter the low-power mode" may be further added to the terminal device, so that the user can allow the terminal device to automatically enter the low-power mode.

Further, the "low-temperature mode" and the "low-power mode" may be simultaneously selected by the user, for example, the foregoing two modes are simultaneously set in the control interface of the terminal device.

According to a fourth aspect, the technical solutions of this application further provide a terminal device, and the terminal device includes any one of the foregoing power supply systems and further includes a power consumption element. The power supply system is configured to supply power to the power consumption element.

Because the terminal device includes the foregoing power supply system, a controller in the power supply system may control a battery pack to be switched between a series mode and a parallel mode. Because an output voltage can be improved in the series mode, the terminal device is prevented from being shut down due to insufficient power supply, and stability when a user uses the terminal device can be improved. In the parallel mode, the voltage step-down circuit may not need to be used, so that discharge efficiency of the battery pack can be improved, and an endurance capability of the terminal device can be increased.

With reference to the fourth aspect, in a first possible implementation, the power supply system for the terminal device includes a battery pack, a bypass circuit, a voltage step-down circuit, and a controller. The battery pack includes a first battery and a second battery. A positive electrode of the first battery is connected to an input end of the voltage step-down circuit, a negative electrode of the first battery is connected to a positive electrode of the second battery by using a second switching transistor, and a negative electrode of the second battery is grounded. One end of a first switching transistor is connected to the negative electrode of the first battery, and another end is grounded. One end of a third switching transistor is connected to the input end of the voltage step-down circuit, and another end is connected to the positive electrode of the second battery.

When the first battery and the second battery are fully charged and work in a scenario of light load and an environment of non-low temperature, the battery pack may be controlled to be switched to the parallel mode. In the parallel mode, the voltage step-down circuit may not need to be used, to improve discharge efficiency of the battery pack and improve an endurance capability of the battery.

When the first battery and the second battery have a low battery, or work in a scenario of heavy load and an environment of low temperature, the battery pack may be controlled to be switched to the series mode. Because an output voltage can be increased in the series mode, the terminal device is prevented from being shut down due to insufficient power supply.

The controller is configured to: when determining that a voltage between two ends of the power consumption element is less than a second preset voltage threshold, determine that the batteries in the battery pack need to be switched to the series mode. The controller is further configured to determine, based on an output voltage of the battery pack and temperature of the battery pack, that the batteries in the battery pack need to be switched to the series mode.

In addition, the controller is further configured to: when determining that a low-temperature mode button is triggered, determine that the batteries in the battery pack need to be switched to the series mode; and when it is determined that a battery level of the battery pack is less than a preset battery level or it is determined that a low-power mode button is triggered, determine that the batteries in the battery pack need to be switched to the series mode.

When the controller controls the battery pack to be switched from the parallel mode to the series mode, the battery pack is initially in the parallel mode, and in the parallel mode, the second switching transistor is in a disconnected state, and the first switching transistor and the third switching transistor are in a closed state.

In a process in which the battery pack is switched from the parallel mode to the series mode, a working status of the voltage step-down circuit and a working status of the bypass circuit may be simultaneously switched. To prevent a high voltage generated when the batteries are connected in series from directly exerting impact on a next circuit, the voltage step-down circuit needs to start working before the second switching transistor is closed. The voltage step-down circuit needs to be enabled to start working in advance because the voltage step-down circuit is not instantaneously enabled, and specific start time is required. The start time is transition time between switching of the voltage step-down circuit and controlling to close the second switching transistor, and may also be referred to as lead time.

To avoid a short circuit between a positive electrode and a negative electrode of the battery in a switching process, after switching the working status of the voltage step-down circuit and the working status of the bypass circuit, the controller first controls both the first switching transistor and the third switching transistor to be disconnected, and keeps the second switching transistor disconnected, and controls, after first preset time, the second switching transistor to be closed. The first preset time may be dead time of the switching transistor, or may be greater than dead time of the switching transistor, to provide sufficient time for switching of the switching transistor, thereby further reducing a probability of a short circuit between a positive electrode and a negative electrode of a battery cell in a switching process.

In the first preset time, an output voltage of the power supply system is maintained relatively stable by a first capacitor and a second capacitor.

When the controller controls the battery pack to be switched from the series mode to the parallel mode, the battery pack is initially in the series mode, and in the series mode, the second switching transistor is in a closed state, and the first switching transistor and the third switching transistor are in a disconnected state.

In a process in which the battery pack is switched from the series mode to the parallel mode, to avoid a short circuit between a positive electrode and a negative electrode of the battery in a switching process, the switching transistors in the battery pack are not simultaneously switched, but the second switching transistor is first controlled to be disconnected and the first switching transistor and the third switching transistor are kept disconnected, and after second preset time, the first switching transistor and the third switching transistor are controlled to be closed. The second preset time may be the dead time of the switching transistor, or may be greater than the dead time of the switching transistor, to provide sufficient time for switching of the switching transistor, thereby further reducing a probability of a short circuit between a positive electrode and a negative electrode of a battery cell in the switching process.

In the first preset time, an output voltage of the power supply system is maintained relatively stable by a first capacitor and a second capacitor.

To prevent a relatively high voltage output by batteries connected in series from directly exerting impact on a next circuit in a switching process, the voltage step-down circuit and the bypass circuit need to be switched after third preset time after statuses of the first switching transistor and the third switching transistor are switched. In other words, the battery pack needs to be first controlled to be switched to the series mode, and then the bypass circuit can be controlled to work, and the voltage step-down circuit can be controlled to stop working. Therefore, the third preset time needs to be greater than the dead time of the switching transistor, to ensure that when the controller controls switching of the voltage step-down circuit and the bypass circuit, the first switching transistor and the third switching transistor are already in an on state.

In an implementation, when the batteries are in the series mode, due to a capacity difference or a self-discharge rate difference between the batteries, voltages of the batteries are different. In this case, directly switching to the parallel mode causes an excessively large surge current between the batteries, and consequently the battery is damaged. To reduce the surge current, fourth preset time is further set in this application, and may also be referred to as balance time, and is time of voltage balancing between the batteries in a process in which the battery pack is switched from the series mode to the parallel mode.

When determining that a voltage of the first battery is less than a voltage of the second battery, the controller first controls the second switching transistor to be disconnected, and after the second preset time, the controller first controls the third switching transistor to be closed, and after the fourth preset time, the controller controls the first switching transistor to be closed, and after the third preset time, the controller controls the bypass circuit to work and the voltage step-down circuit to stop working.

When the controller determines that a voltage of the first battery is equal to a voltage of the second battery, the two batteries may be simultaneously connected, and there is no surge current between the batteries. The controller first controls the second switching transistor to be disconnected, and after the second preset time, controls the first switching transistor and the third switching transistor to be closed, and after the third preset time, the controller controls the bypass circuit to work and the voltage step-down circuit to stop working.

When determining that a voltage of the first battery is greater than a voltage of the second battery, the controller first controls the second switching transistor to be disconnected, and after the second preset time, the controller controls the first switching transistor to be closed, and after the fourth preset time, the controller controls the third switching transistor to be closed, and after the third preset time, the controller controls the bypass circuit to work and the voltage step-down circuit to stop working.

A high-voltage battery is switched first to supply power, and a low-voltage battery is switched later to supply power after balance time. Therefore, a voltage difference between the batteries is reduced, and a surge current between the batteries is reduced.

To simplify a control signal and a control procedure for controlling the voltage step-down circuit and the bypass circuit, when the controller determines that the output voltage of the battery pack is greater than a first preset threshold voltage, the controller determines that the voltage step-down circuit works and the bypass circuit does not work in this case; and when the controller determines that the output voltage of the battery pack is less than or equal to the first preset threshold voltage, the controller determines that the bypass circuit works and the voltage step-down circuit does not work in this case. In this way, automatic switching of the bypass circuit and the voltage step-down circuit is implemented.

The first preset threshold voltage is greater than a maximum output voltage of the battery pack in the parallel mode and less than a minimum output voltage of the battery pack in the series mode.

In the foregoing technical solutions, the low-temperature mode button may be a virtual button, or may be a physical button, and the low-power mode button may be a virtual button, or may be a physical button.

It may be understood that "connection" in the foregoing technical solutions may be a direct connection, or may be an indirect connection. For example, that the output end of the battery pack is connected to the input end of the voltage step-down circuit may be that the output end of the battery pack is directly connected to the input end of the voltage step-down circuit, or may be that the output end of the battery pack is connected to the input end of the voltage step-down circuit by using a resistor.

It may be understood that the power consumption element in the foregoing technical solutions may be at least any component in a CPU (full name: Central Processing Unit), a GPU (full name: Graphics Processing Unit), a baseband processor, a memory, a display screen, a radio frequency component, an audio component, and a sensor. Certainly, the power consumption element may alternatively be another power consumption element in the terminal device.

It may be understood that the terminal device in the foregoing technical solutions may be a mobile phone, such as a smartphone or a foldable phone, or may be a tablet computer or a wearable device, or may be a head-mounted device, such as a virtual reality device or an augmented reality device. Certainly, the terminal device may alternatively be another terminal device with a battery.

It may be understood that the battery pack in the foregoing technical solutions may include two batteries, three batteries, or certainly more batteries.

It may be understood that the controller in the foregoing technical solutions may be an application processor, or may be a power management unit PMU. Certainly, the controller may alternatively be another processor.

It can be learned from the foregoing technical solutions that the technical solutions in this application have the following advantages:

When the batteries in the battery pack are in the series mode, the controller in the power supply system can control the voltage step-down circuit to work, and control the bypass circuit to stop working; and when the batteries in the battery pack are in the parallel mode, the controller can further control the bypass circuit to work, and control the voltage step-down circuit to stop working. An output voltage can be improved in the series mode, so that the terminal device can be prevented from being shut down due to insufficient power supply, and stability when the user uses the terminal device can be improved. In the parallel mode, the voltage step-down circuit may not need to be used, so that discharge efficiency of the battery pack can be improved, and an endurance capability of the battery can be increased.

DETAILED DESCRIPTION OF ILLUSTRATIVE EMBODIMENTS

With popularization of technologies, a plurality of batteries are used in increasingly more terminal devices to supply power. A type of the terminal device is not specifically limited in the embodiments of this application. The terminal device may be a mobile phone, a notebook computer, a wearable electronic device (such as a smartwatch), a tablet computer, an augmented reality (augmented reality, AR) device, a virtual reality (virtual reality, VR) device, a vehicle-mounted device, or the like to which a plurality of batteries supply power.

A terminal device to which a plurality of batteries supply power is first described below.

Figure 1:
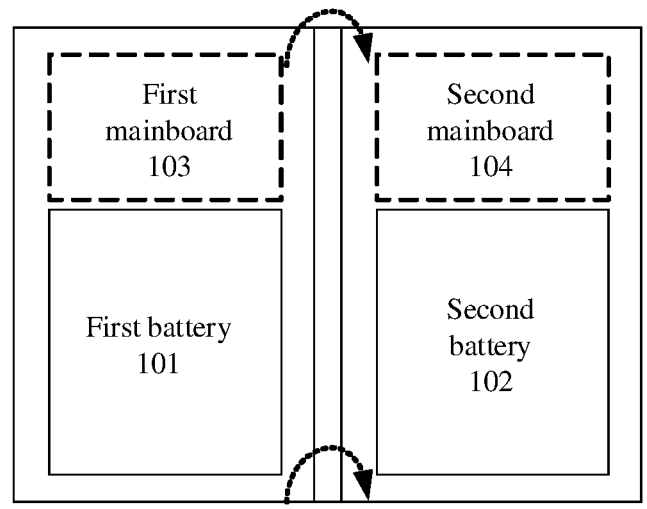
FIG. 1 is a schematic diagram in which a plurality of batteries are used for power supply in a folding screen architecture.

FIG. 1 is a schematic diagram in which a plurality of batteries are used for power supply in a folding screen architecture.

One side of a terminal device with a folding screen includes a first battery 101 and a first mainboard 103, and the other side includes a second battery 102 and a second mainboard 104. A battery pack including the first battery 101 and the second battery 102 supplies power to the terminal device.

Figure 2:
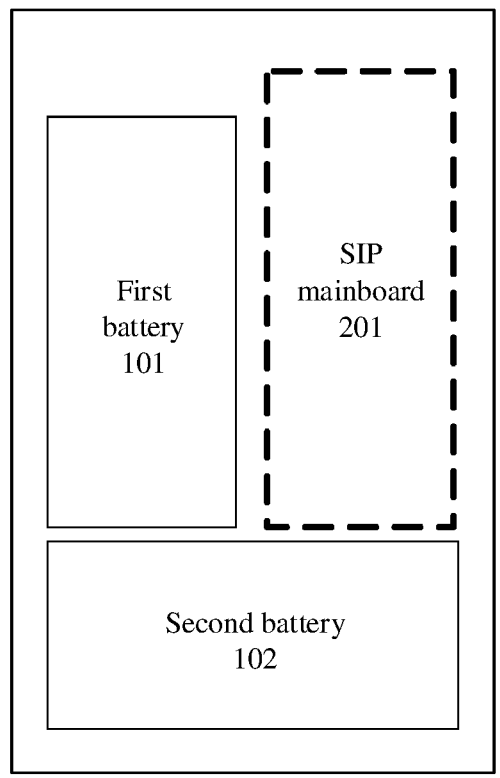
FIG. 2 is a schematic diagram in which a plurality of batteries are used for power supply.

FIG. 2 is a schematic diagram in which a plurality of batteries are used for power supply.

The device includes a SIP mainboard 201, a first battery 101, and a second battery 102. A battery pack including the first battery 101 and the second battery 102 supplies power to a terminal device.

When a battery pack of a terminal device includes a plurality of batteries, the battery pack usually uses a parallel mode. As an example for description below, the terminal device is a mobile phone, and the battery pack of the terminal device includes two batteries: the first battery and the second battery.

Figure 3:
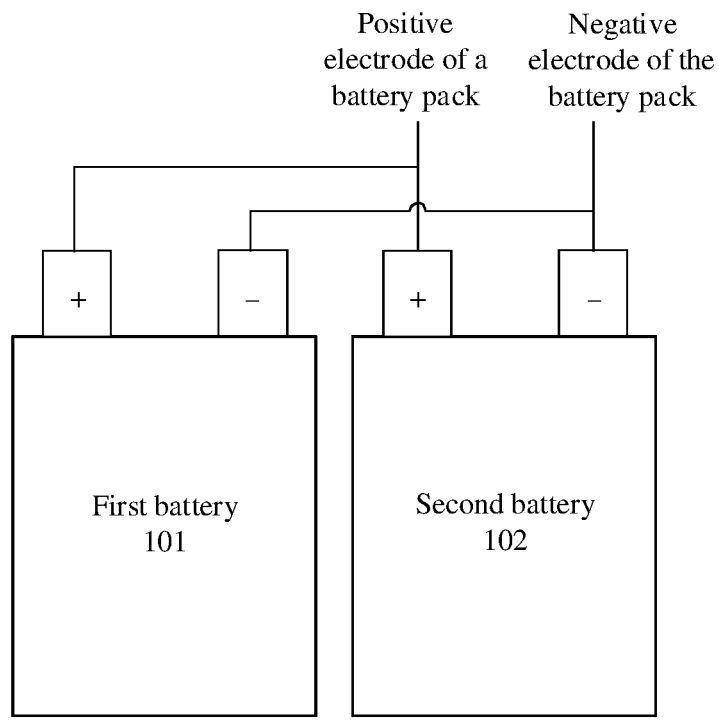
FIG. 3 is a schematic diagram in which a plurality of batteries are in a parallel mode according to an embodiment of this application.

FIG. 3 is a schematic diagram in which a plurality of batteries are in a parallel mode according to an embodiment of this application.

When a battery pack uses a parallel mode, a positive electrode of a first battery 101 is connected to a positive electrode of a second battery 102 to form a positive electrode of the battery pack, and a negative electrode of the first battery 101 is connected to a negative electrode of the second battery 102 to form a negative electrode of the battery pack.

In this case, output voltages of the batteries in the battery pack are the same, and are equal to an output voltage of the battery pack. The output voltage of the battery pack is relatively low, and an output voltage range may be 3.6 V to 4.2 V. Because the battery has internal resistance and the internal resistance of the battery increases with a temperature decrease of the battery, when ambient temperature is low, battery temperature is correspondingly low, and the internal resistance of the battery increases and can rise from approximately 20 mΩ to approximately 1Ω. With impact of a same current, an increase in the internal resistance of the battery causes a decrease in an output voltage of the battery, and the output voltage of the battery pack is correspondingly reduced. When the output voltage of the battery pack is less than a shutdown threshold voltage of a mobile phone (for example, the shutdown threshold voltage of the mobile phone is 2.6 V), the mobile phone is shut down. Such a problem often occurs in cold winter, and affects use of the mobile phone by a user outdoors. In addition, when a battery level is relatively low, the output voltage of the battery pack is relatively low, and the terminal device is also prone to shut down.

Therefore, when the battery pack uses the parallel mode, stability of the terminal device is reduced.

Figure 4:
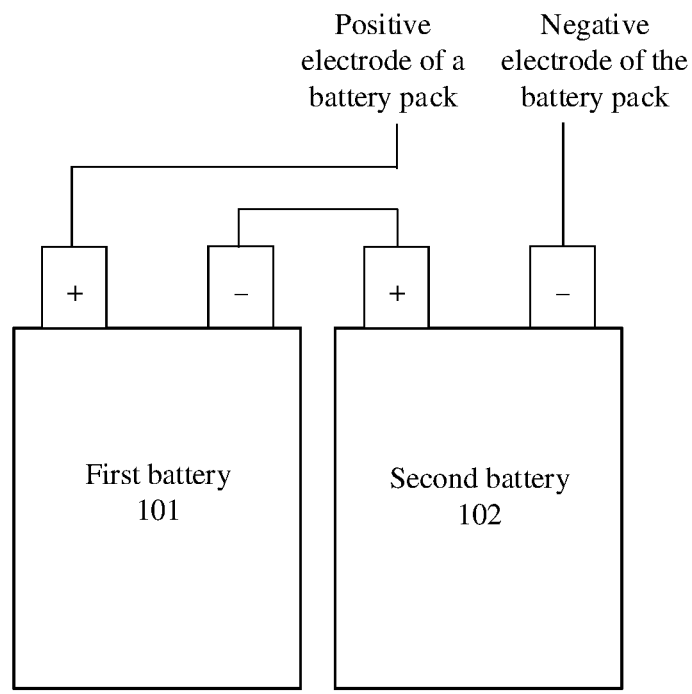
FIG. 4 is a schematic diagram in which a plurality of batteries are in a series mode according to an embodiment of this application.

To resolve the foregoing technical problem, an embodiment of this application provides a power supply system for a terminal device. The power supply system includes a battery pack, a bypass circuit, a voltage step-down circuit, and a controller. The controller included in the power supply system can control the battery pack to be switched between a series mode and a parallel mode. For a schematic diagram of the battery pack in the parallel mode, refer to FIG. 3. For a schematic diagram of the battery pack in the series mode, refer to FIG. 4. When determining that batteries in the battery pack need to be switched to the series mode, the controller can further control the voltage step-down circuit to work and control the bypass circuit to stop working, and when determining that the batteries in the battery pack need to be switched to the parallel mode, the controller can further control the bypass circuit to work and control the voltage step-down circuit to stop working. The controller may control switching between the series mode and the parallel mode based on an actual application scenario. Because an output voltage can be improved in the series mode, the terminal device can be prevented from being shut down due to insufficient power supply, and stability of using the terminal device by the user can be improved. In the parallel mode, the voltage step-down circuit does not need to be used, and therefore, discharge efficiency of the battery pack can be improved. Therefore, an endurance capability of the battery can be increased, and user experience can be improved.

The following clearly describes the technical solutions in the embodiments of this application with reference to the accompanying drawings in the embodiments of this application.

Embodiment 1 of a Power Supply System

Figure 5:
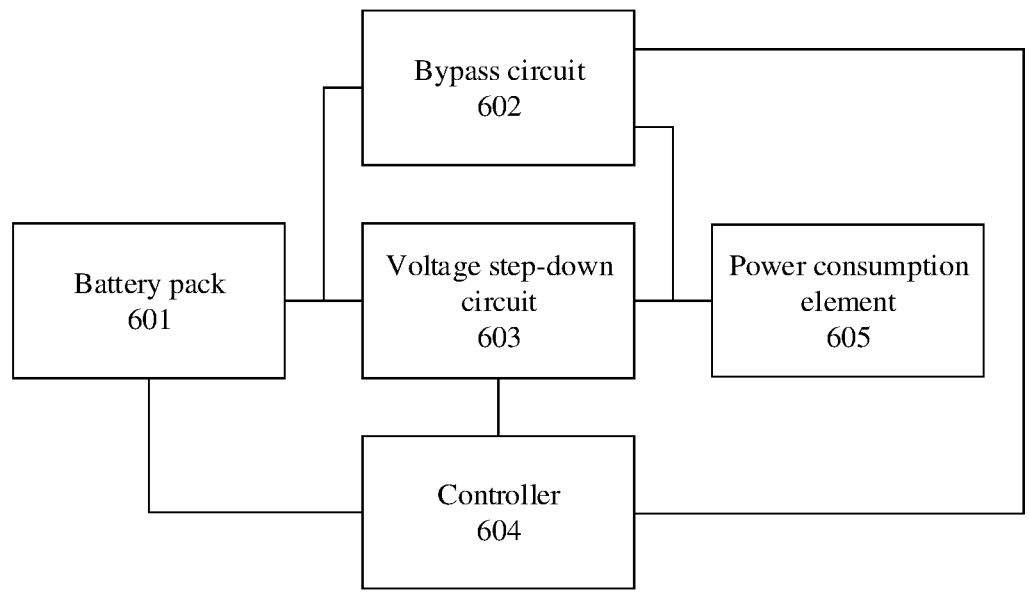
FIG. 5 is a schematic diagram of a power supply system for a terminal device according to an embodiment of this application.

FIG. 5 is a schematic diagram of a power supply system for a terminal device according to an embodiment of this application.

The power supply system for the terminal device provided in this embodiment of this application includes a battery pack 601, a bypass circuit 602, a voltage step-down circuit 603, a controller 604, and a power consumption element 605.

Figure 6:
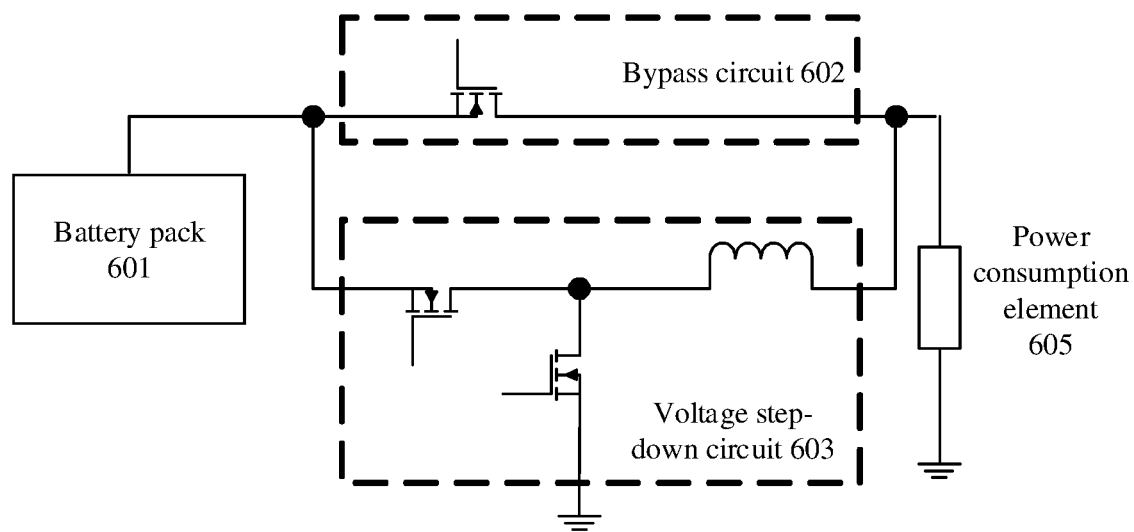
FIG. 6 is a diagram of a circuit of a power supply system according to an embodiment of this application.

FIG. 6 is a diagram of a circuit of a power supply system according to an embodiment of this application.

An output end of the battery pack 601 is connected to an input end of the voltage step-down circuit 603, an output end of the voltage step-down circuit 603 is connected to the power consumption element 605 of the terminal device, and two ends of the bypass circuit 602 are connected to the input end and the output end of the voltage step-down circuit 603.

The controller 604 is connected to the battery pack 601, the bypass circuit 602, and the voltage step-down circuit 603.

When determining that batteries in the battery pack 601 need to be switched to a series mode, the controller 604 controls the voltage step-down circuit 603 to work, and controls the bypass circuit 602 to stop working. In the series mode, an output voltage of the battery pack 601 is greater than a voltage at which the power consumption element 605 works normally. Therefore, the battery pack 601 cannot directly supply power to the power consumption element 605, and the voltage step-down circuit 603 needs to step down the output voltage of the battery pack 601.

The controller 604 may determine, based on a plurality of criteria, that the batteries need to be switched to the series mode, for example, based on a voltage between two ends of the power consumption element, or based on the output voltage of the battery pack and battery temperature, or based on a battery level of the battery pack.

It may be understood that the controller 604 may further determine, based on the foregoing at least two criteria at the same time, that the batteries need to be switched to the series mode. For example, the controller 604 controls, only when determining, based on the voltage between the two ends of the power consumption element, that the battery pack needs to be switched to the series mode, and determining, based on the output voltage of the battery pack and the battery temperature, that the battery pack needs to be switched to the series mode, the battery pack to be switched to the series mode. The battery pack is controlled, only when all the plurality of criteria meet requirements, to be switched to the series mode, so that accuracy of determining, by the controller, that the battery pack needs to be switched to the series mode is improved.

An implementation of the voltage step-down circuit 603 is also not specifically limited in this embodiment, and a circuit with a voltage step-down function may be used. For example, the voltage step-down circuit 603 may be specifically any one of the following: a buck circuit, a switched capacitor (switched capacitor), a three-level direct current-direct current circuit, and a single-ended primary-inductor converter (single ended primary inductor converter).

When determining that the batteries in the battery pack 601 need to be switched to a parallel mode, the controller 604 controls the bypass circuit 602 to work, so that the bypass circuit 602 bypasses the voltage step-down circuit 603. In the parallel mode, the output voltage of the battery pack 601 is relatively low, and may be configured to supply power to the power consumption element 605, and the voltage step-down circuit 603 does not need to step down the output voltage of the battery pack 601.

It may be understood that when the battery pack does not need to work in the series mode, the battery pack may work in the parallel mode.

During product implementation, the controller 604 described in the foregoing embodiment may be specifically implemented by a processor (CPU) of the terminal device, a PMU (Power Management Unit, power management unit), or a combination of a CPU and a PMU.

An implementation of the bypass circuit 602 is not specifically limited in this embodiment, and the bypass circuit 602 works when the battery pack uses the parallel mode. For example, the bypass circuit 602 may include the following switching components:

a transistor (Transistor), a relay, a load switch, and a metal-oxide semiconductor field-effect transistor (Metal Oxide Semiconductor, MOS transistor for short). The MOS transistor may be an NMOS transistor or a PMOS transistor.

FIG. 6 shows a case in which the bypass circuit 602 includes one switching component. In an actual product, the bypass circuit 602 may alternatively include a plurality of switching components. When the bypass circuit 602 includes a plurality of switching components, the plurality of switching components are connected in series, and types of the plurality of switching components may be the same or may be different. For example, when the bypass circuit 602 includes two same switching components and both the two switching components are NMOS transistors, the bypass circuit 602 may include at least two NMOS transistors that are connected in series.

When determining that batteries in the battery pack need to be switched to the series mode, the controller included in the terminal device provided in this embodiment of this application can control the voltage step-down circuit to work and control the bypass circuit to stop working, and when determining that the batteries in the battery pack need to be switched to the parallel mode, the controller can further control the bypass circuit to work and control the voltage step-down circuit to stop working. The controller may control, based on an actual application scenario, the battery pack to be switched between the series mode and the parallel mode. Because an output voltage can be improved in the series mode, the terminal device can be prevented from being shut down due to insufficient power supply, and therefore stability of using the terminal device by a user is improved. In the parallel mode, the voltage step-down circuit does not need to be used, and therefore discharge efficiency of the battery pack can be improved. Therefore, an endurance capability of the battery can be increased, and user experience can be improved.

The battery pack in the power supply system can be switched between the parallel mode and the series mode. A working principle of switching the batteries from the parallel mode to the series mode is first described below.

Embodiment 2 of a Power Supply System

Figure 7:
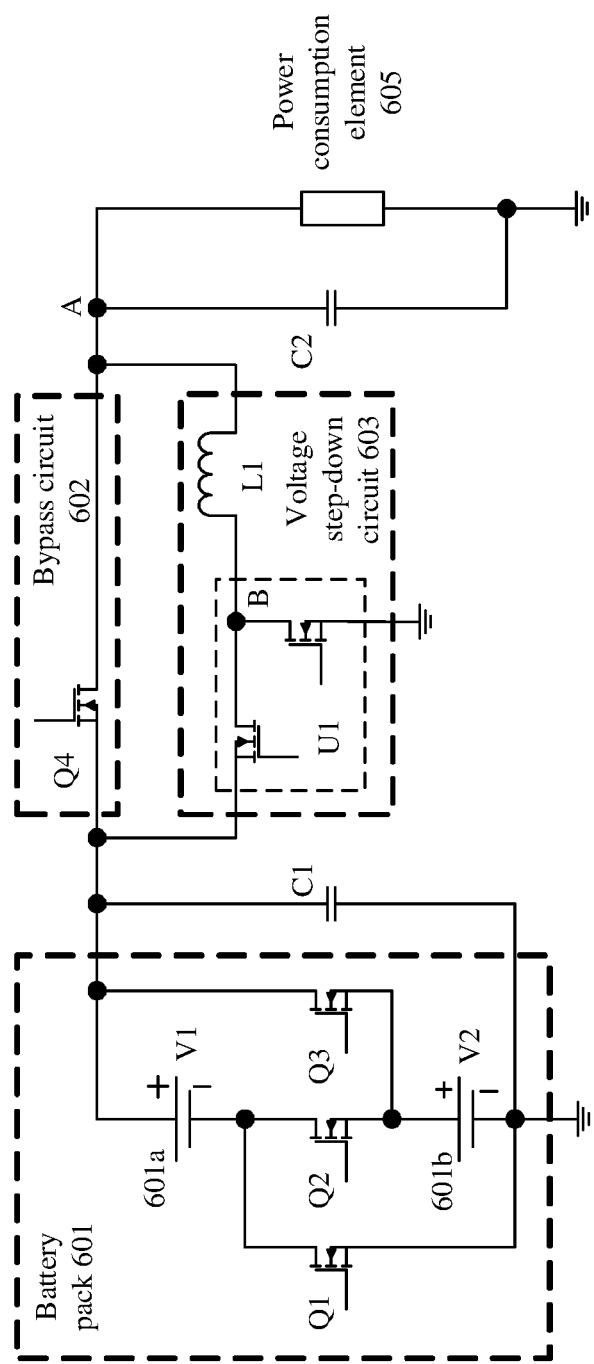
FIG. 7 is a schematic diagram of another power supply system for a terminal device according to an embodiment of this application.

FIG. 7 is a schematic diagram of another power supply system for a terminal device according to an embodiment of this application.

A battery pack 601 in the power supply system includes at least the following two batteries: a first battery 601a and a second battery 601b. An output voltage of the first battery 601a is V1, and an output voltage of the second battery 601b is V2. The battery pack 601 further includes a first switching transistor Q1, a second switching transistor Q2, and a third switching transistor Q3.

A positive electrode of the first battery 601a is connected to an input end of a voltage step-down circuit 603, a negative electrode of the first battery 601a is connected to a positive electrode of the second battery 601b by using the second switching transistor Q2, and a negative electrode of the second battery 601b is grounded.

One end of the first switching transistor Q1 is connected to the negative electrode of the first battery 601a, and another end is grounded. One end of the third switching transistor Q3 is connected to the input end of the voltage step-down circuit 603, and another end is connected to the positive electrode of the second battery 601b.

The switching transistors Q1, Q2, and Q3 may be any one of or a combination of a transistor, a relay, a load switch, and a metal-oxide semiconductor field-effect transistor. Generally, in a specific product, Q1, Q2, and Q3 may use switching transistors of a same type, so that the controller may perform control by using a same control signal. This is not specifically limited in this embodiment of this application. The controller may control different on/off combination states of Q1, Q2, and Q3 to implement a serial connection and a parallel connection between the first battery 601a and the second battery 601b.

In this embodiment, as an example for description, the bypass circuit 602 includes a fourth switching transistor Q4, and the voltage step-down circuit 603 is a buck circuit.

The controller is not shown in the figure. When the controller determines that the first battery 601a and the second battery 601b need to be switched to a series mode, the controller controls the first switching transistor Q1 and the third switching transistor Q3 to be disconnected, and controls the second switching transistor Q2 to be closed.

The power supply system may further include a first capacitor C1 and a second capacitor C2. A first end of the first capacitor C1 is connected to an output end of a battery pack 601, and a second end of the first capacitor C1 is grounded. A first end of the second capacitor C2 is connected to an input end of a power consumption element 605, and a second end of the second capacitor C2 is grounded. Both the first capacitor C1 and the second capacitor C2 may be used for voltage stabilization and filtering, to improve power supply quality. In addition, for an actual terminal device, the first capacitor C1 and the second capacitor C2 may actually be equivalent capacitors including a plurality of capacitors.

When the controller determines that the first battery 601a and the second battery 601b need to be switched to a parallel mode, the controller controls the second switching transistor Q2 to be disconnected, and controls the first switching transistor Q1 and the third switching transistor Q3 to be closed.

An implementation in which the controller determines that batteries in the battery pack 601 are switched between the parallel mode and the series mode is specifically described below.

Manner 1: A working mode of the battery pack is determined by using a voltage between two ends of the power consumption element.

The controller may determine the voltage between the two ends of the power consumption element based on a current output voltage of the battery pack, a current flowing through the power consumption element, and impedance of each circuit component. When determining that the voltage between the two ends of the power consumption element is less than a second preset voltage threshold, the controller determines that the battery pack needs to be switched from the parallel mode to the series mode. The second preset voltage threshold may be set to a shutdown threshold voltage of the terminal device, for example, the shutdown threshold voltage may be 2.6 V.

Specific descriptions are provided below with reference to the accompanying drawings.

Figure 8:
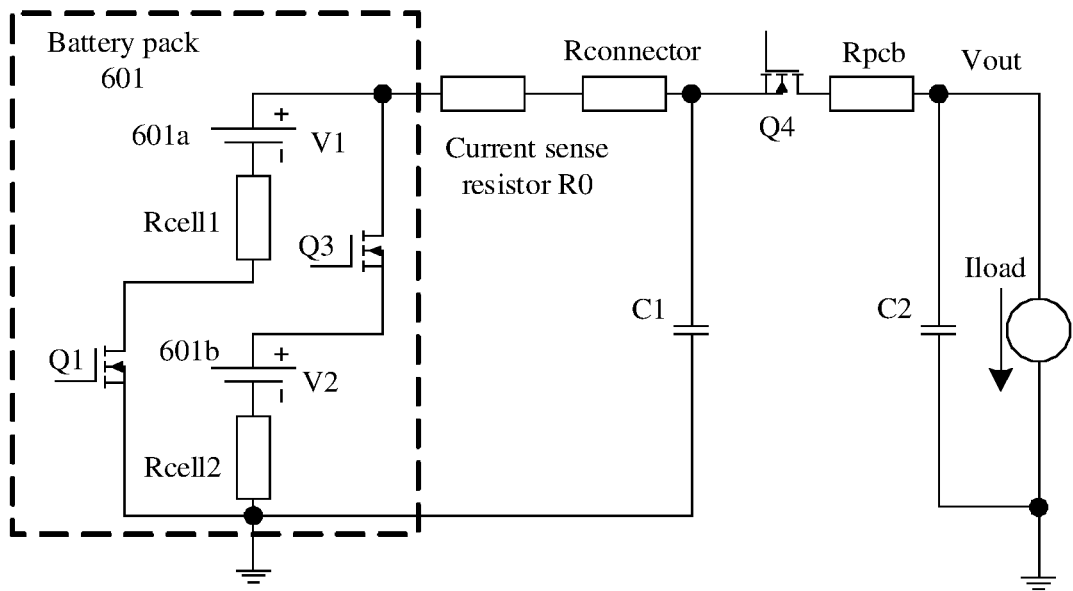
FIG. 8 is a schematic diagram of a discharge capability evaluation circuit according to an embodiment of this application.

FIG. 8 is a schematic diagram of a discharge capability evaluation circuit according to an embodiment of this application.

When the battery pack is in the parallel mode, both the first switching transistor Q1 and the third switching transistor Q3 are closed, the second switching transistor is disconnected, and the bypass circuit works. Electrochemical cell voltages of the first battery 601a and the second battery 601b that are in the parallel mode are equal; in other words, V1=V2.

Rcell1 and Rcell2 are equivalent internal resistance of batteries respectively representing the first battery 601a and the second battery 601b, Rconnector is equivalent impedance of a battery connector, Rpcb is equivalent impedance of a cable on a board, Rq1, Rq3, and Rq4 are respectively equivalent impedance when the switching transistors Q1, Q3, and Q4 are conducted, and the foregoing impedance each is a known parameter.

The controller may measure a voltage between two ends of a current sense resistor (Current Sense Resistor) R0 of a discharge path in real time, and determine, based on a ratio of the voltage between the two ends of the current sense resistor to impedance of the current sense resistor, a current Iload that flows through the power consumption element 605. The battery included in the battery pack may be connected to the terminal device by using the battery connector, and the current sense resistor R0 may be disposed near the battery connector to detect a current of the battery pack. An output voltage Vout of the power supply system may be determined by using the following formula:

$$Vout=V1-((Rcell1+Rq1)//(Rcell2+Rq3)+Rconnector+Rq4+Rpcb+R0)\times Iload \quad (1)$$

(Rcell1+Rq1)//(Rcell2+Rq3) in the formula (1) represents resistance when Rcell1 and Rq1 connected in series and Rcell2 and Rq3 connected in series are connected in parallel. When Vout determined by using the formula (1) is less than or equal to the second preset voltage threshold, it indicates that a voltage output capability of the current parallel mode is insufficient to support normal working of the power consumption element 605, and the battery pack needs to be switched to the series mode.

It should be noted that both the battery internal resistance Rcell1 and the battery internal resistance Rcell2 may be related to battery temperature, and the battery internal resistance may increase as the temperature decreases. Therefore, in a low temperature environment, Vout determined by using the formula (1) is greater than an actual output voltage of the power supply system. To switch the batteries in the battery pack 601 to the series mode in a timely manner, in a possible implementation, different battery temperature may correspond to different second preset voltage thresholds, and when the battery temperature is relatively low, a corresponding second preset voltage threshold is relatively high. A correspondence between the battery temperature and the second preset voltage threshold is prestored in the terminal device. Temperature of the battery pack may be detected in real time to obtain a second preset voltage threshold corresponding to the current temperature, and the current output voltage Vout of the power supply system that is determined based on the formula (1) is compared with the second preset voltage threshold corresponding to the current temperature, to determine whether the battery pack needs to be switched to the series mode.

In another possible implementation, because a relationship in which the battery internal resistance Rcell1 and the battery internal resistance Rcell2 change with temperature may be a predetermined function relationship, temperature of the first battery 601a and temperature of the second battery 601b may be detected in real time, and then the corresponding resistance Rcell1 and the corresponding resistance Rcell2 at the current temperature are determined based on the predetermined function relationship. Further, a current output voltage Vout of the power supply system is determined based on the formula (1), and the output voltage Vout of the power supply system is compared with a second preset voltage threshold, to determine whether the battery pack needs to be switched to the series mode. In this case, the second preset voltage threshold may be set to a shutdown threshold voltage of the terminal device, for example, the shutdown threshold voltage may be 2.6 V.

The temperature may be measured by using a thermistor, and a correspondence between a resistance value of the thermistor and the temperature may be a predetermined function relationship. The controller obtains, by measuring a resistance value of a thermistor in the battery, battery temperature corresponding to the resistance value. A thermistor of an NTC (Negative Temperature Coefficient, negative temperature coefficient) type may be used in the battery.

Manner 2: A working mode of the battery pack is determined by using a table searching method.

The controller may select, based on a load current, a table corresponding to the load current. When the load current is greater than a preset current, a heavy-load table is correspondingly used, and when the load current is less than or equal to the preset current, a light-load table is correspondingly used. The controller may determine the working mode of the battery pack based on an output voltage of the battery pack and temperature of the battery pack by searching a corresponding table.

The controller may measure a voltage between two ends of a current sense resistor of a discharge path in real time, and a ratio of the voltage between the two ends of the current sense resistor to impedance of the current sense resistor is the load current. The output voltage of the battery pack may be obtained through ADC sampling. The controller may obtain, by detecting a resistance value of a thermistor, temperature corresponding to the resistance value, to determine battery temperature. A thermistor of an NTC type may be used in the battery.

The controller determines whether a current load current is greater than a preset current. The preset current is determined based on an actual terminal device, and this is not specifically limited in this embodiment of this application. When the load current is greater than the preset current, the controller determines that the controller is in a heavy-load scenario in this case. When the load current is less than the preset current, the controller determines that the controller is in a light-load scenario in this case. The heavy-load scenario and the light-load scenario correspond to different tables.

A heavy-load table shown in Table 1 and a light-load table shown in Table 2 are used as examples for description. "Series" in the tables indicates the series mode and "Parallel" indicates the parallel mode.

TABLE 1

Heavy-load table
Table (heavy-load scenario)

| Voltage | Temperature | | | | |
|---|---|---|---|---|---|
| | −30 | −20 | −10 | 0 | 10 |
| 4.5 | Parallel | Parallel | Parallel | Parallel | Parallel |
| 4 | Series | Parallel | Parallel | Parallel | Parallel |
| 3.5 | Series | Series | Parallel | Parallel | Parallel |
| 3 | Series | Series | Series | Parallel | Parallel |
| 2.5 | Series | Series | Series | Series | Parallel |
| 2 | Series | Series | Series | Series | Series |

TABLE 2

Light-load table
Table (light-load scenario)

| Voltage | Temperature | | | | |
|---|---|---|---|---|---|
| | −30 | −20 | −10 | 0 | 10 |
| 4.5 | Parallel | Parallel | Parallel | Parallel | Parallel |
| 4 | Parallel | Parallel | Parallel | Parallel | Parallel |
| 3.5 | Series | Parallel | Parallel | Parallel | Parallel |
| 3 | Series | Series | Parallel | Parallel | Parallel |
| 2.5 | Series | Series | Series | Parallel | Parallel |
| 2 | Series | Series | Series | Series | Parallel |

A principle of determining, by the controller by using a table, the working mode in which the battery pack needs to be is described below by using an example.

For example, when the load current is greater than the preset current, it is determined that the controller is in the heavy-load scenario in this case, and the heavy-load table is correspondingly used. When a detected battery voltage is 3.5 V and battery temperature is 0° C., it can be learned from Table 1 that the battery pack needs to be switched to the parallel mode.

Due to limited storage space of the terminal device, voltage/temperature states in the table may not need to be exhaustive, and an actually measured voltage and temperature may be rounded to a nearest defined status point. For example, when the load current is greater than the preset current, the battery voltage is 3.7 V, and the battery temperature is 2° C., it is first determined that the heavy-load table is correspondingly used, and then it is determined that a defined status point closest to 3.7 V is 3.5 V, and a defined status point closest to 2° C. is 0° C. Therefore, (3.5 V, 0° C.) is obtained after (3.7 V, 2° C.) is rounded, and it is determined from the table that a parallel discharge mode is correspondingly used.

Figure 9:
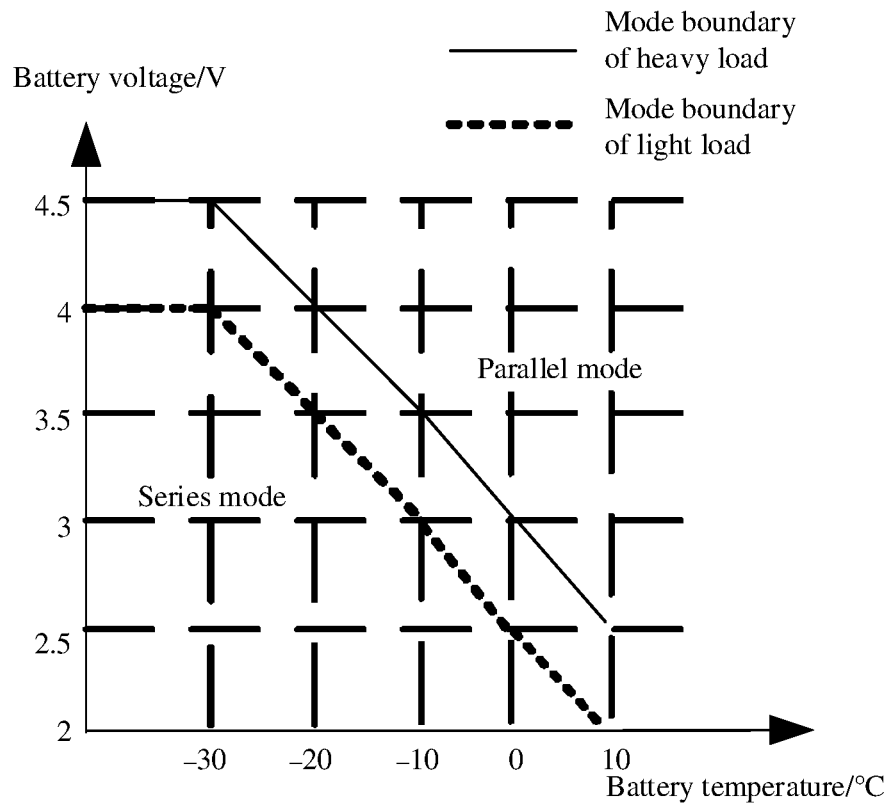
FIG. 9 is a schematic diagram of a mode boundary according to an embodiment of this application.

FIG. 9 is a schematic diagram of a mode boundary according to an embodiment of this application.

Mode boundaries in the heavy-load scenario and the light-load scenario may be determined based on corresponding data in Table 1 and Table 2. In the figure, a mode boundary corresponding to the heavy-load scenario (Table 1) is a solid line, and a mode boundary corresponding to the light-load scenario (Table 2) is a dashed line. The foregoing tables may be represented more vividly by using the figure. Coordinates of a status point may be represented as (battery temperature, battery voltage). A working mode in which the battery needs to be in this case may be determined based on an area in which the status point is located.

A current mode boundary is determined based on a magnitude relationship between the load current and the preset current. When the status point falls on a right side of the mode boundary, it indicates that the parallel mode is optimal in this scenario, and the battery pack needs to be switched to the parallel mode. When the status point falls on a left side of the mode boundary, it indicates that the battery pack needs to be switched to the series mode. It should be noted that a mode boundary of heavy load is on a right side of a mode boundary of light load.

Figure 10:
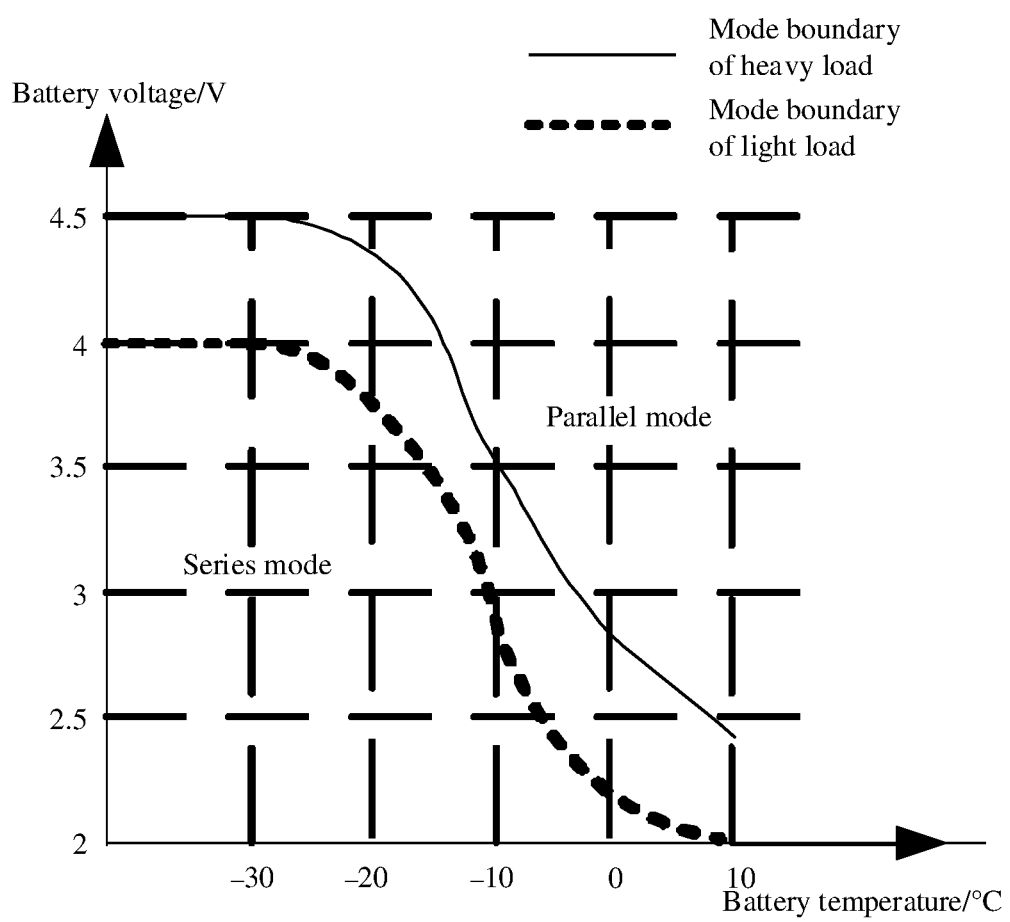
FIG. 10 is a schematic diagram of another mode boundary according to an embodiment of this application.

In the foregoing descriptions, the mode boundary determined by using the table is a straight line. In addition, the mode boundary may alternatively be a curve. For details, refer to a schematic diagram of the mode boundary shown in FIG. 10.

The foregoing examples are merely for ease of description. The mode boundary is determined based on an actual working status of the terminal device. Different terminal devices may correspond to different tables, and corresponding mode boundaries may also be different.

It can be learned from the foregoing descriptions that, in a scenario of low temperature, a low voltage, and heavy load, the series mode is preferentially used, to prevent the device from being abnormally shut down, and in a scenario of light load, the parallel mode is preferentially used, to increase standby time of the device.

Manner 3: A working mode of the battery pack is determined by using a function value.

To reduce occupation of storage space of the terminal device, the foregoing table may alternatively be replaced with a preset function f. The controller substitutes an output voltage U of the battery pack 601 and battery temperature T into the preset function f to obtain a function value. When the function value is less than or equal to a preset value, it is determined that the batteries in the battery pack 601 need to be switched to the series mode.

The controller is further configured to select the preset value based on a magnitude of a load current. When the load current is greater than a preset current, a first preset value is correspondingly used, and when the load current is less than or equal to the preset current, a second preset value is correspondingly used, where the first preset value is less than the second preset value. In other words, a heavy-load scenario corresponds to the first preset value, and a light-load scenario is corresponding to the second preset value.

The preset value represents a threshold voltage for switching between the series mode and the parallel mode at 0° C. For example, the heavy-load scenario corresponds to the first preset value. When the function value is greater than the first preset value, the battery pack needs to be in the parallel mode. When the function value is less than or equal to the first preset value, the series mode is appropriate.

The preset value may be obtained in advance through experiment. For example, when determined battery temperature is ° C., a discharge test is performed on batteries of different voltages, and a voltage drop is measured. If a voltage drops below a shutdown threshold voltage (for example, 2.6 V) of the terminal device during the discharge test, the voltage is a preset value corresponding to a current load condition.

A factor that affects the preset value is mainly a low-temperature discharge capability of a used battery, and a higher low-temperature discharge capability of the used battery may lead to a smaller preset value. A function value of the preset function is positively correlated to the battery temperature T, the function value of the preset function is positively correlated to the output voltage U of the battery pack, and the preset function is set based on an actual working requirement of the terminal device. This embodiment of this application sets no specific limitation on the preset function.

Descriptions are provided below with reference to data in Table 1 and Table 2 by using a linear function f=a×T+U as an example of the preset function. It may be understood that the preset function f may alternatively be a function of another type, for example, an exponential function. For example, the preset function is as follows:

$$f=0.05\times T+U \quad (2)$$

In addition, the first preset value is 3, and the second preset value is 2.5. In the heavy-load scenario, when f≤3, the batteries in the battery pack 601 need to be in the series mode, and when f>3, the batteries in the battery pack 601 need to be in the parallel mode. In the light-load scenario, when f≤2.5, the batteries in the battery pack 601 need to be in the series mode, and when f>2.5, the battery pack needs to be in the parallel mode.

For example, when the load current is greater than the preset current, a current battery voltage is 3.7 V, and battery temperature is 2° C., the first preset value is correspondingly used in this case. It may be determined based on the formula (2) that f=3.8. Because f>3, the battery pack corresponds to the parallel mode. It may be found that, a same result is obtained in the foregoing manner compared with table searching in the manner 3.

In addition, because the first preset value corresponding to the heavy-load scenario is greater than the second preset value corresponding to the light-load scenario, it also indicates that the parallel mode is preferentially used in the light-load scenario, to increase standby time of the device.

The terminal device may switch the working mode of the battery pack by using the foregoing implementations. In addition, the terminal device may alternatively perform forced switching by using a control interface of the terminal device; in other words, a user who uses the terminal device triggers switching. The following provides specific descriptions with reference to the accompanying drawing.

Figure 11:
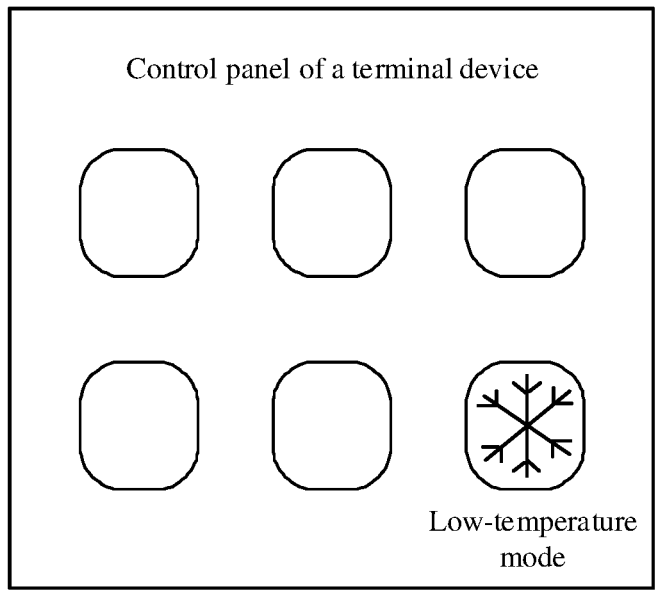
FIG. 11 is a schematic diagram of a control interface of a terminal device according to an embodiment of this application.

FIG. 11 is a schematic diagram of a control interface of a terminal device according to an embodiment of this application.

A "low-temperature mode" is added to the control interface of the terminal device. In a possible implementation, a user may determine, based on current ambient temperature, whether to enter the low-temperature mode. For example, when the user is in a cold outdoor area, to enable the terminal device to work stably, the user may choose to enter the "low-temperature mode". In another possible implementation, the control interface of the terminal device may display battery temperature in real time. When the battery temperature is less than a preset temperature value (for example, −10° C.), the user is indicated to enter the "low-temperature mode", to improve stability of the terminal device. After the user chooses to enter the "low-temperature mode", the controller determines that a low-temperature mode button is triggered, and a battery pack is switched to a series mode. When the user exits the "low-temperature mode", a power supply system is switched to an automatic mode, and a controller in the power supply system automatically selects a most appropriate working mode.

It may be understood that, the "low-temperature mode" is disposed in the control interface of the terminal device. In response to triggering of the user, the terminal device enters the low-temperature mode, and the battery pack is switched to the series mode. In this case, ambient temperature in which the terminal device is located may make no difference, but the battery pack is switched to the series mode based on triggering the "low-temperature mode" by the user.

It may be understood that the foregoing button may be a physical button, or may be a corresponding icon on a touchscreen.

Figure 12:
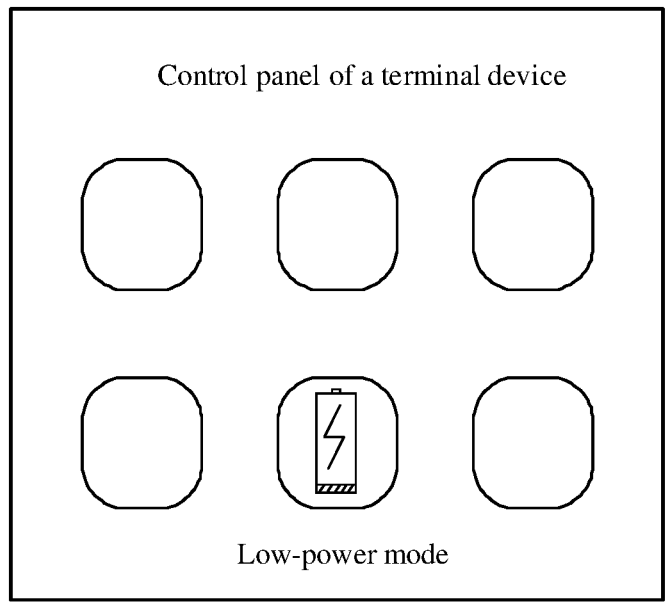
FIG. 12 is a schematic diagram of another control interface of a terminal device according to an embodiment of this application.

FIG. 12 is a schematic diagram of another control interface of a terminal device according to an embodiment of this application.

A "low-power mode" is added to the control interface of the terminal device. After a user actively chooses to enter the "low-power mode", a controller determines that a low-power mode button is triggered, and a battery pack needs to be switched to a series mode. When the user exits the "low-power mode", a power supply system is switched to an automatic mode, and the controller in the power supply system automatically selects a most appropriate working mode.

Further, the terminal device may further have a setting button for allowing the terminal device to automatically enter the low-power mode. For example, an option "allow the terminal device to automatically enter the low-power mode" may be added in the control interface. The user may enable this option to allow the terminal device to automatically enter the low-power mode. In other words, when the controller determines that a battery level of the battery pack is less than a preset battery level, the controller controls the terminal device to automatically enter the "low-power mode", and determines that the battery pack is in the series mode. This embodiment of this application imposes no specific limitation on the preset battery level. For example, the preset battery level may be 10%, 15%, or the like of a total battery level, or the user may adjust the preset battery level on the terminal device based on an actual situation.

Further, the "low-temperature mode" and the "low-power mode" may be simultaneously selected by the user, for example, the foregoing two modes are simultaneously set in the control interface of the terminal device.

The controller may switch the battery pack from the parallel mode to the series mode in any one of the foregoing manners. A working principle of controlling, by the controller, the battery pack to be switched from the parallel mode to the series mode is specifically described below by using an example in which the first switching transistor Q1, the second switching transistor Q2, and the third switching transistor Q3 are each an NMOS transistor.

Figure 13A:
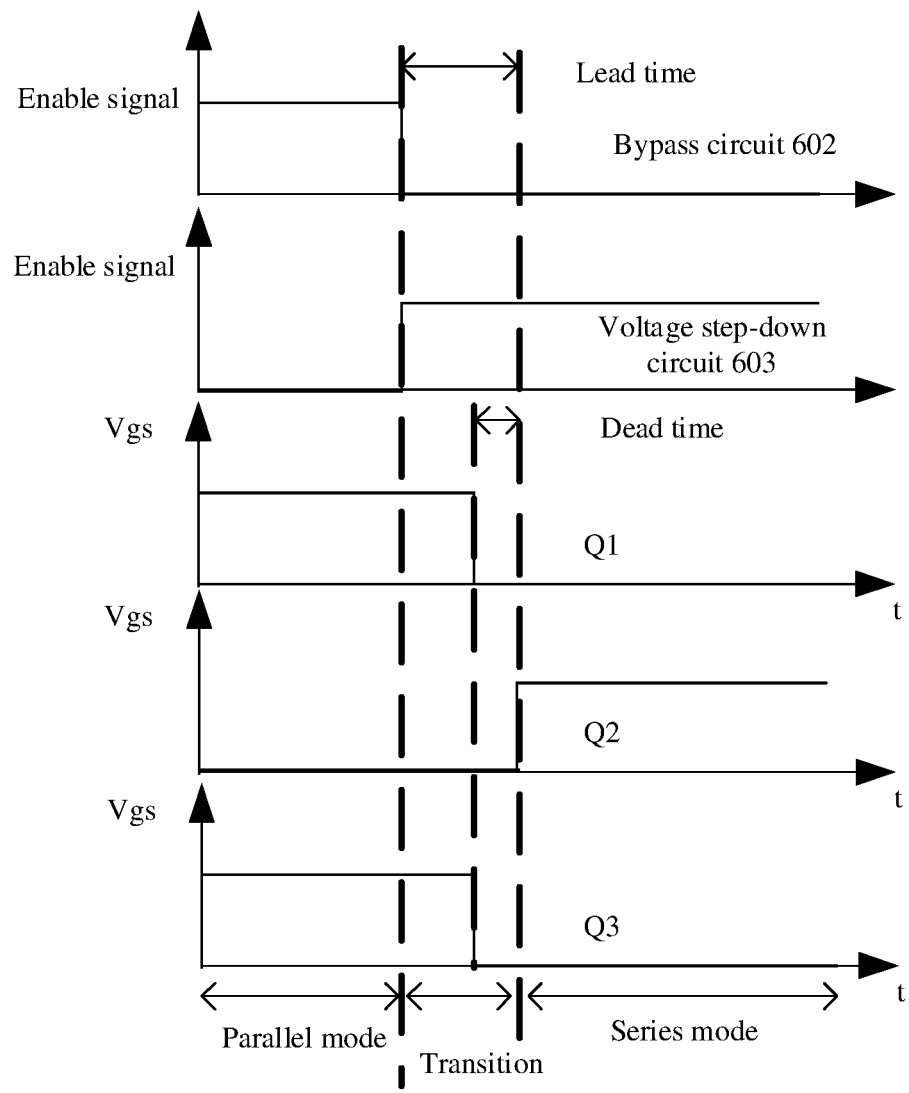
FIG. 13a is a diagram of a control sequence of switching from a parallel mode to a series mode according to an embodiment of this application.

Refer to both FIG. 13a and FIG. 7. FIG. 13a is a diagram of a control sequence of switching from a parallel mode to a series mode according to an embodiment of this application.

The controller controls the bypass circuit 602 and the voltage step-down circuit 603 by using an enable signal. The enable signal may be a level signal, and can control working statuses of switching transistors in the bypass circuit 602 and the voltage step-down circuit 603.

When an enable signal of the bypass circuit 602 is at a high level, the controller controls the bypass circuit 602 to work. When the enable signal of the bypass circuit 602 is at a low level, the controller controls the bypass circuit 602 to stop working.

When an enable signal of the voltage step-down circuit 603 is at a high level, the controller controls the voltage step-down circuit 603 to work. When the enable signal of the voltage step-down circuit 603 is at a low level, the controller controls the voltage step-down circuit 603 to stop working.

Vgs is a voltage between a gate and a source of the switching transistor. When Vgs is at a high level, the switching transistor is on. When Vgs is at a low level, the switching transistor is off.

When the controller controls the batteries to be switched from the parallel mode to the series mode, the voltage step-down circuit 603 needs to be enabled to work, and the bypass circuit 602 needs to be enabled to stop working. To prevent a relatively high voltage output after the batteries are directly connected in series from directly exerting impact on a next circuit, switching of the voltage step-down circuit 603 and the bypass circuit 602 may be performed before statuses of the switching transistors Q1, Q2, and Q3 are switched.

The batteries are initially in the parallel mode, and in the parallel mode, the second switching transistor Q2 is in a disconnected state, and the first switching transistor Q1 and the third switching transistor Q3 are in a closed state.

To avoid a short circuit between a positive electrode and a negative electrode of the battery in a switching process, for example, a short circuit between a positive electrode and a negative electrode of the first battery 601a when the second switching transistor Q2 and the third switching transistor Q3 are simultaneously on, or a short circuit between a positive electrode and a negative electrode of the second battery 601b when the first switching transistor Q1 and the second switching transistor Q2 are simultaneously on, or a short circuit between a positive electrode and a negative electrode of the first battery 601a and a short circuit between a positive electrode and a negative electrode of the second battery 601b when the first switching transistor Q1, the second switching transistor Q2, and the third switching transistor Q3 are simultaneously on, the switching transistors in the battery pack 601 are not simultaneously switched, but the first switching transistor Q1 and the third switching transistor Q3 are first controlled to be disconnected, and the second switching transistor Q2 is kept disconnected; and after first preset time, the second switching transistor Q2 is controlled to be closed. The first preset time may be dead time (Dead time) of an NMOS transistor.

Figure 13B:
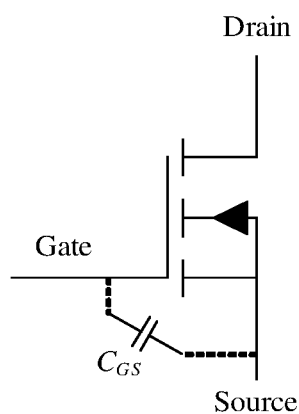
FIG. 13b is a schematic diagram of a parasitic capacitor of an NMOS transistor according to an embodiment of this application.
Figure 13C:
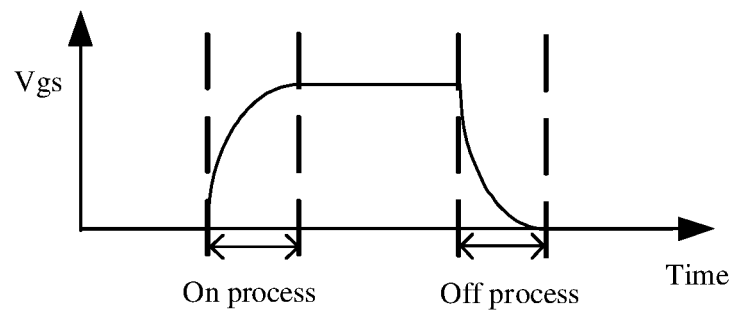
FIG. 13c shows a Vgs curve of a conduction process and a disconnection process of an NMOS transistor according to an embodiment of this application.

Refer to both FIG. 13b and FIG. 13c. FIG. 13b is a schematic diagram of a parasitic capacitor of an NMOS transistor according to an embodiment of this application. FIG. 13c shows a Vgs curve of an on process and an off process of an NMOS transistor according to an embodiment of this application.

In this embodiment of this application, the dead time is set to avoid a short circuit between a positive electrode and a negative electrode of a battery cell in a switching process. For the NMOS transistor, a parasitic capacitor $C_{GS}$ exists between the gate and the source. After a control signal of the controller arrives, because specific time is required for charging and discharging the parasitic capacitor $C_{GS}$ between the gate and the source, there is a delay in conducting and disconnecting the NMOS transistor. Smaller $C_{GS}$ of a selected NMOS transistor and a stronger driving capability of the control signal lead to shorter charging and discharging time and a smaller delay, and therefore, smaller dead time may be set.

Due to limitations of a semiconductor process, $C_{GS}$ is highly discrete. To avoid the short circuit between the positive electrode and the negative electrode of the battery cell in the switching process, sufficient dead time needs to be ensured. For example, when a model of the selected NMOS transistor is DMG7430LFG, a capacitance value of $C_{GS}$ of the selected NMOS transistor is 1.28 nF. When AUIRS2191S is selected for a drive control chip, a driving capability of the drive control chip is 3.5 A. When the drive control chip drives the foregoing NMOS transistor, actually measured dead time needs to be greater than or equal to 100 ns.

It may be understood that the first preset time may alternatively be greater than the dead time of the NMOS transistor, to provide sufficient time for switching of the switching transistor, and further reduce a probability of the short circuit between the positive electrode and the negative electrode of the battery cell in the switching process. For example, when the dead time is 100 ns, the first preset time may be greater than the dead time, for example, may be set to 110 ns.

First, both the first switching transistor Q1 and the third switching transistor Q3 are controlled to be disconnected, and the second switching transistor Q2 is kept disconnected; and then, after the dead time, the second switching transistor Q2 is controlled to be closed. Therefore, the switching transistors Q1, Q2, and Q3 are all disconnected in the dead time, and the batteries in the battery pack are not connected to a circuit. In this case, the first capacitor C1 and the second capacitor C2 can maintain a relatively stable output voltage of the power supply system in the dead time.

In the dead time, the first capacitor C1 and the second capacitor C2 supply power to the power consumption element. Therefore, the dead time needs to be directly proportional to a sum of capacitance values of the first capacitor C1 and the second capacitor C2; in other words, longer dead time indicates a larger sum of the required capacitance values of C1 and C2. The sum of the capacitance values of the first capacitor C1 and the second capacitor C2 included in the terminal device can generally reach a level of 200 μF, and the dead time is generally a level of 100 ns. The sum of the capacitance values of the first capacitor C1 and the second capacitor C2 may be sufficient to maintain a relatively stable output voltage of the power supply system in the dead time. Specific descriptions are provided below by using an example.

Q indicates a charge amount, $U_{before}$ indicates a voltage between two ends of the first capacitor C1 and the second capacitor C2 before the dead time, $U_{after}$ indicates a voltage between two ends of the first capacitor C1 and the second capacitor C2 after the dead time, $T_{DeadTime}$ indicates a length of the dead time, and $I_{pulse}$ indicates a load current in the dead time. The following formula may be obtained according to a charge conservation law:

$$Q=(C1+C2)\times U_{before}=(C1+C2)\times U_{after}+I_{pulse}\times T_{DeadTime} \quad (3)$$

$U_{drop}$ represents a voltage drop in the dead time. It can be determined from the formula (3) that $U_{drop}$ meets the following formula:

$$U_{drop} = U_{before} - U_{after} = \frac{I_{pluse} \times T_{DeadTime}}{C1 + C2} \quad (4)$$

When the sum of the capacitance values of the first capacitor C1 and the second capacitor C2 is 200 μF, that is, C1+C2=200 uF, the dead time $T_{DeadTime}$ is equal to 100 ns, and the load current $I_{pulse}$ in the dead time is 10 A, it can be determined from the formula (4) that the voltage drop $U_{drop}$ in the dead time is 5 mV, and the voltage drop is relatively small and hardly affects normal working of the terminal device. It can be learned that the sum of the capacitance values of the first capacitor C1 and the second capacitor C2 may be sufficient to maintain a relatively stable output voltage of the power supply system in the dead time.

The controller simultaneously switches the working statuses of the bypass circuit 602 and the voltage step-down circuit 603, that is, controls the bypass circuit 602 to work while controlling the voltage step-down circuit 603 to stop working. Transition time between switching of the voltage step-down circuit 603 and the bypass circuit 602 and controlling the second switching transistor Q2 to be closed may be referred to as lead time (Lead time).

In a process in which the battery pack is switched from the parallel mode to the series mode, the voltage step-down circuit 603 needs to start working before the second switching transistor Q2 is closed, to prevent a high voltage generated when the batteries are connected in series from directly exerting impact on a next circuit. The voltage step-down circuit 603 needs to be enabled in advance to start working because the voltage step-down circuit 603 is not instantaneously enabled, and specific start time is required. The start time is the lead time, and the lead time is related to a chip model of the voltage step-down circuit 603. Different chip models may correspond to different lead time. For example, if the chip model of the voltage step-down circuit 603 is TPS54610, the start time of the voltage step-down circuit 603 is 3.35 ms, and therefore, the lead time needs to be greater than or equal to 3.35 ms. The controller in the power supply system provided in this embodiment of this application controls, based on real-time information such as temperature of the battery pack, a battery output voltage, and the load current, the battery pack to be switched from the parallel mode to the series mode. Therefore, the controller can control the battery pack to be switched from the parallel mode to the series mode in a scenario such as relatively low ambient temperature (for example, outdoor in winter), a relatively low battery of the battery pack, and heavy load. Because an output voltage can be improved in the series mode, a probability that the terminal device is shut down due to insufficient power supply can be reduced, so that stability when the terminal device is applied to the foregoing scenario is improved, and therefore user experience in the foregoing scenario is improved. Specific descriptions are provided below with reference to a simulated diagram.

Figure 14:
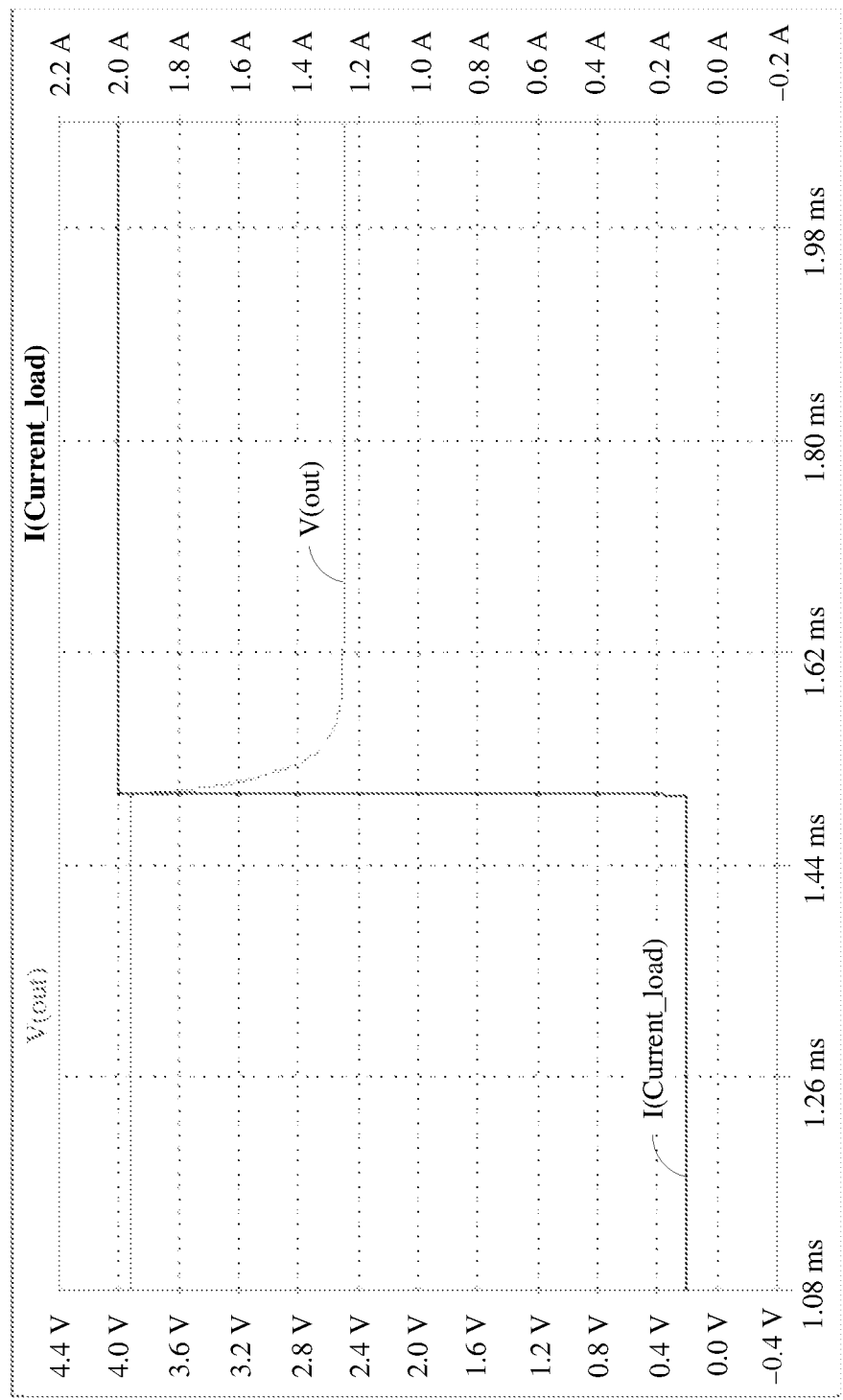
FIG. 14 is a simulated diagram of a parallel mode according to an embodiment of this application.

FIG. 14 is a simulated diagram of a parallel mode according to an embodiment of this application.

A simulation condition is: A battery voltage is 4.0 V, battery internal resistance is 1Ω (the battery internal resistance is relatively large at low temperature), a load current is 2 A, and a shutdown threshold voltage of the terminal device is 2.6 V. When the batteries are in the parallel mode, an output voltage V(out) of the battery pack drops to 2.5 V, and is already lower than the shutdown threshold voltage of the terminal device. In this case, the terminal device is abnormally shut down.

Figure 15:
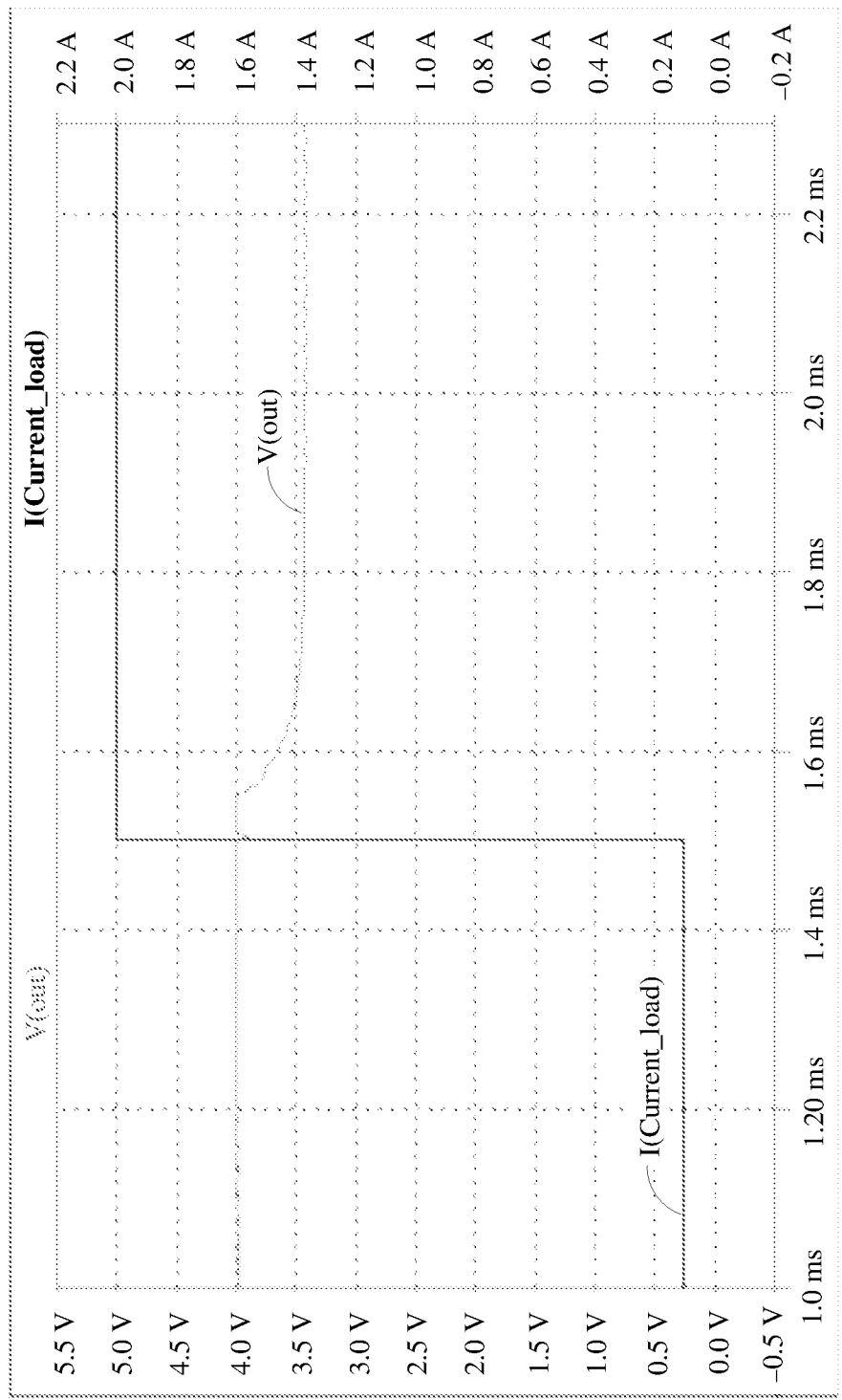
FIG. 15 is a simulated diagram of a series mode according to an embodiment of this application.

FIG. 15 is a simulated diagram of a series mode according to an embodiment of this application.

In a same simulation condition, because the controller controls the batteries to be switched from the parallel mode to the series mode, in this case, V(out) is an input voltage of the power consumption element, that is, corresponds to a voltage at a point A in FIG. 7, and V(out) is 3.4 V and is still greater than the shutdown threshold voltage of the terminal device. In this case, the terminal device is not abnormally shut down.

Further, in a process of controlling the batteries to be switched from the parallel mode to the series mode, the controller further smoothly switches the bypass circuit and the voltage step-down circuit, so that voltage impact exerted by a relatively high output voltage generated after the batteries connected in series on a next circuit is reduced, and a short circuit between a positive electrode and a negative electrode of the battery in the switching process is further avoided, and stability of the terminal device is therefore improved. Specific descriptions are provided below with reference to a simulated diagram.

Figure 16:
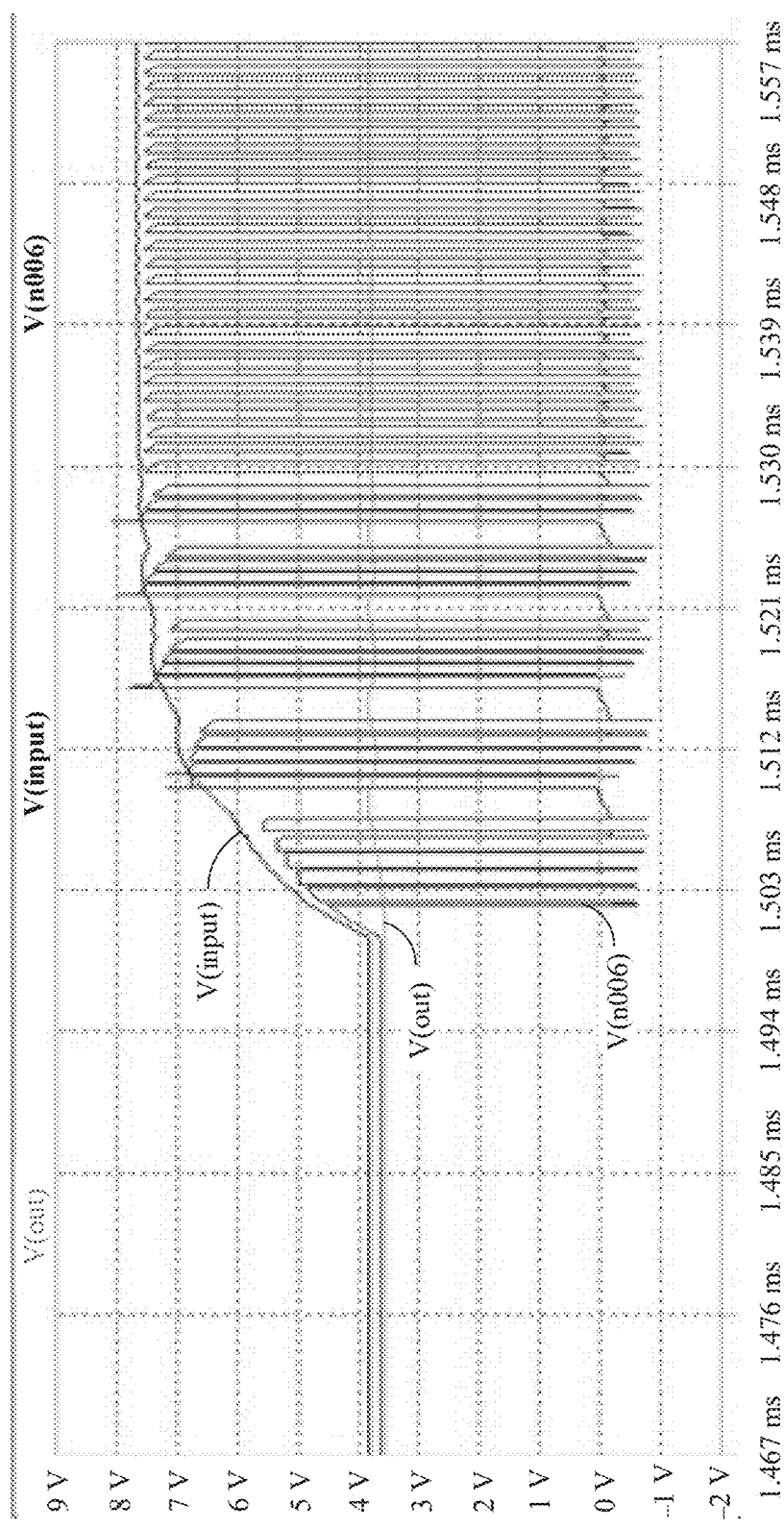
FIG. 16 is a simulated diagram of mode switching according to an embodiment of this application.

FIG. 16 is a simulated diagram of mode switching according to an embodiment of this application.

When the controller controls the batteries to be switched from the parallel mode to the series mode, the bypass circuit 602 stops working, and the voltage step-down circuit 603 starts working. In the figure, V(input) is a total input voltage (a black line in the figure) of the first battery 601a and the second battery 602b, V(n006) is a voltage (a dark gray line in the figure) of a left-end node B of an inductor Li in the voltage step-down circuit 603, and V(out) is an input voltage of the power consumption element, that is, corresponds to a voltage (a light gray line in the figure) at the point A in FIG. 7. It can be found by observing a curve of V(out) that, before and after the batteries are switched to the series mode, a voltage fluctuation range of V(out) is relatively small, and this indicates that the bypass circuit and the voltage step-down circuit are smoothly switched, and relatively small impact is exerted on stability of the terminal device.

Figure 17:
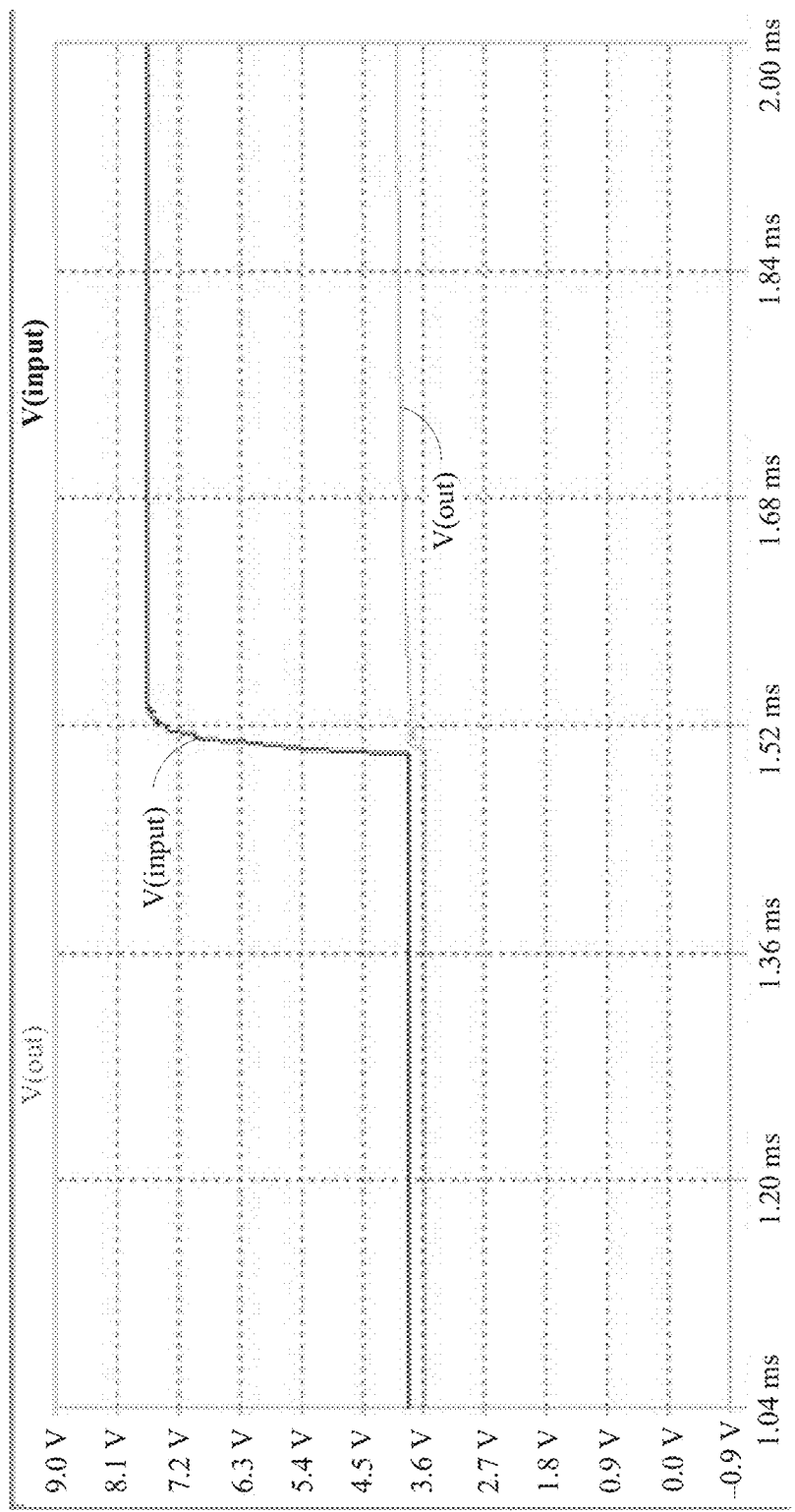
FIG. 17 is a simulated diagram of voltages before and after a battery mode is switched according to an embodiment of this application.

Further refer to FIG. 17. FIG. 17 is a simulated diagram of voltages before and after a battery mode is switched according to an embodiment of this application.

The figure more clearly reflects a voltage change before and after the battery mode is switched, where V(input) is a total input voltage of the first battery 601a and the second battery 602b. When the batteries are switched from the parallel mode to the series mode, V(input) increases from original 3.8 V to approximately 7.6 V, and it can be found by observing a curve of V(out) that a voltage fluctuation range of V(out) is relatively small before and after the battery mode is switched, and this indicates that relatively small impact is exerted on a next circuit after the batteries are switched to the series mode, and a relatively stable output voltage can be maintained.

The working principle of controlling, by the controller, the batteries to be switched from the parallel mode to the series mode is described in the foregoing embodiments. A working principle of controlling, by the controller, the batteries to be switched from the series mode to the parallel mode is described below.

Embodiment 3 of a Power Supply System

Still refer to FIG. 7. When the controller determines that the first battery 601a and the second battery 601b need to be switched to the parallel mode, the controller controls the second switching transistor Q2 to be disconnected, and controls the first switching transistor Q1 and the third switching transistor Q3 to be closed.

For various manners in which the controller determines that the batteries in the battery pack 601 need to be switched from the series mode to the parallel mode, refer to related descriptions in Embodiment 2. Details are not described herein in this embodiment. A working principle in which the controller controls the battery pack to be switched from the series mode to the parallel mode is specifically described below.

Figure 18:
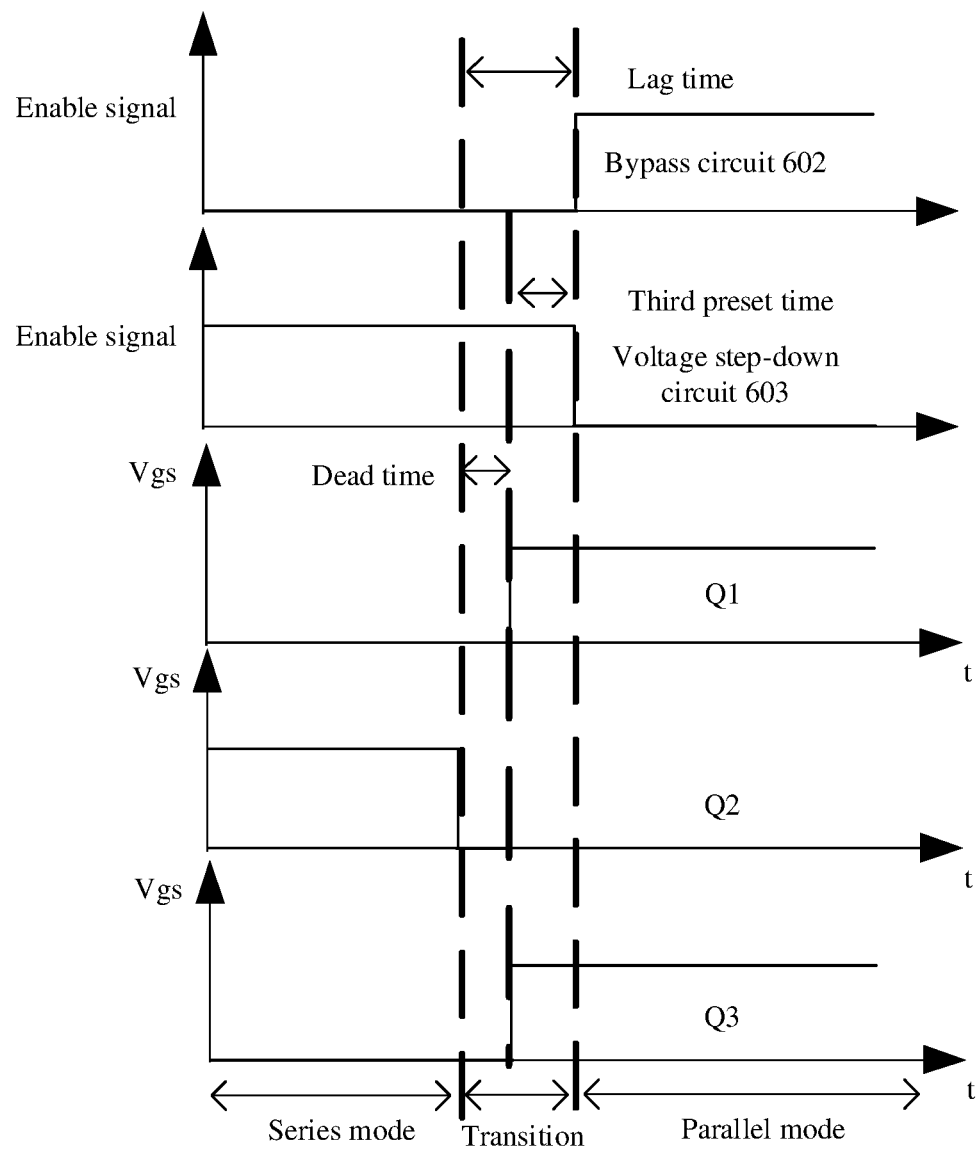
FIG. 18 is a diagram of a control sequence of switching from a series mode to a parallel mode according to an embodiment of this application.

FIG. 18 is a diagram of a control sequence of switching from a series mode to a parallel mode according to an embodiment of this application.

When the controller controls the batteries to be switched from the series mode to the parallel mode, the bypass circuit 602 needs to be enabled to work, and the voltage step-down circuit 603 needs to be enabled to stop working. To prevent a relatively high voltage output when the batteries connected in series in a switching process from directly exerting impact on a next circuit, the voltage step-down circuit 603 and the bypass circuit 602 need to be switched after statuses of the switching transistors Q1, Q2, and Q3 are switched.

The battery pack is initially in the series mode, and in this case, the second switching transistor Q2 is in a closed state, and the first switching transistor Q1 and the third switching transistor Q3 are in a disconnected state, and when the switching transistor controls the batteries to be switched from the series mode to the parallel mode, the first switching transistor Q1 and the third switching transistor Q3 are still kept disconnected. To avoid a short circuit between a positive electrode and a negative electrode of the battery in a switching process, the switching transistors in the battery pack 601 are not simultaneously switched, but the second switching transistor Q2 is first controlled to be disconnected, and after second preset time, the first switching transistor Q1 and the third switching transistor Q3 are controlled to be closed, and after third preset time, the bypass circuit 602 is controlled to work, and the voltage step-down circuit 603 is controlled to stop working. The second preset time may be dead time. For specific descriptions of the dead time, refer to the foregoing system embodiment 2. Details are not described herein again in this embodiment. A sum of the dead time and the third preset time is lag time (Lag time).

To avoid a short circuit between a positive electrode and a negative electrode of the battery in a switching process, the battery pack needs to be first controlled to be switched to the series mode, and then the bypass circuit 602 can be controlled to work and the voltage step-down circuit 603 can be controlled to stop working. Therefore, the third preset time needs to be greater than dead time of an NMOS transistor, to ensure that when the controller controls switching of the voltage step-down circuit 603 and the bypass circuit 602, the first switching transistor Q1 and the third switching transistor Q3 are already in an on state.

In the dead time, the first switching transistor Q1, the second switching transistor Q2, and the third switching transistor Q3 are all closed. In this case, the first capacitor C1 and the second capacitor C2 are configured to maintain a relatively stable output voltage of the power supply system in the dead time.

The controller in the power supply system provided in this embodiment of this application can control, based on real-time information such as temperature of the battery pack, a battery output voltage, and the load current, the battery pack to be switched from the series mode to the parallel mode. Therefore, in a scenario in which ambient temperature is relatively normal, the battery pack is fully charged, and load is light, the controller can control the battery pack to be switched from the series mode to the parallel mode, to improve discharge efficiency of the battery pack, and prolong standby time of the terminal device, so that user experience in the foregoing scenario is improved.

In addition, in a process in which the controller controls the batteries to be switched from the series mode to the parallel mode, a switching process can be stably performed, so that stability of the terminal device is improved. Specific descriptions are provided below with reference to a simulated diagram.

Figure 19:
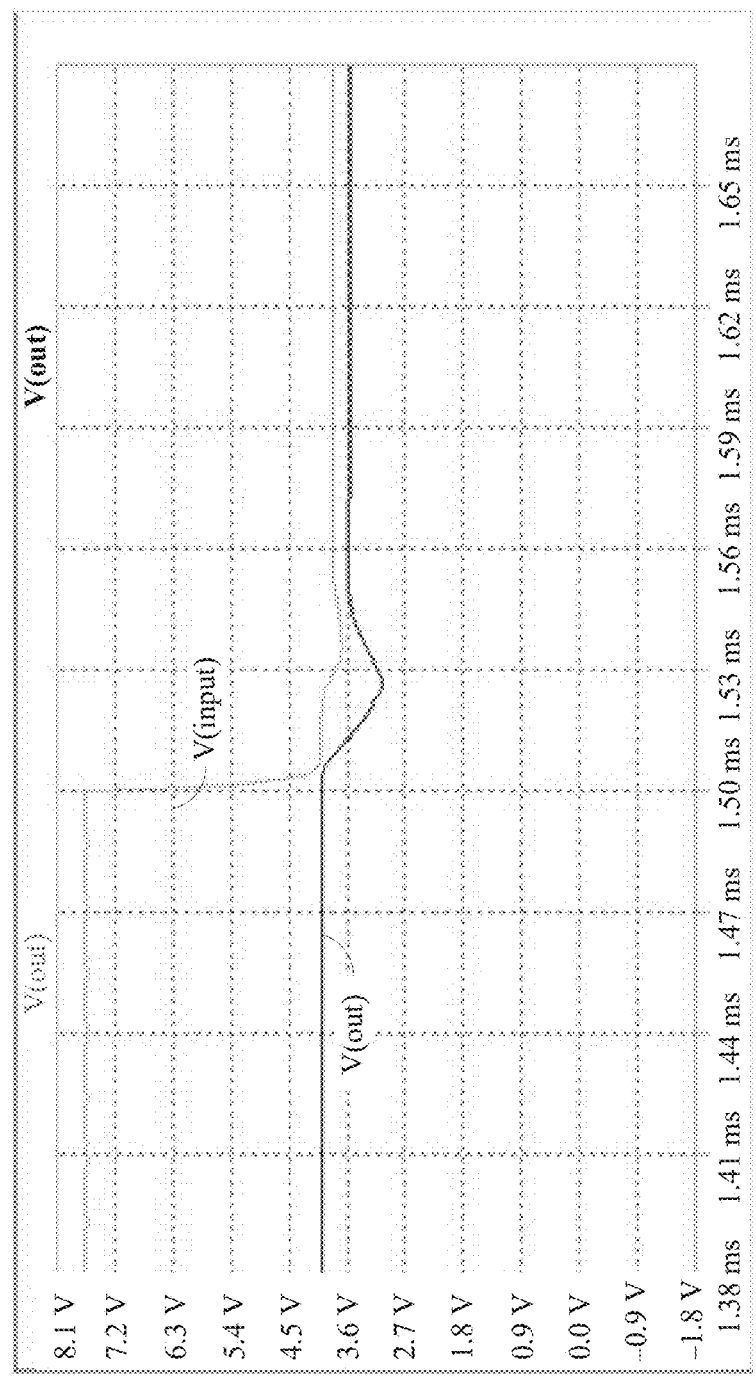
FIG. 19 is a simulated diagram of switching from a series mode to a parallel mode according to an embodiment of this application.

FIG. 19 is a simulated diagram of switching from a series mode to a parallel mode according to an embodiment of this application.

It can be found by observing a curve of V(out) that when the batteries are switched from the series mode to the parallel mode, a voltage fluctuation range of V(out) is relatively small, and is always greater than a shutdown threshold voltage of the terminal device. This indicates smooth transition during mode switching of the batteries, little impact is exerted on a next circuit, and a relatively stable output voltage can be maintained.

When the batteries are in the series mode, due to a capacity difference or a self-discharge rate difference between the batteries, voltages of the batteries are different. In this case, directly switching to the parallel mode causes an excessively large surge current between the batteries, and consequently the battery is damaged. The following specifically describes, with reference to the accompanying drawings, a principle of reducing a surge current when the controller controls the batteries to be switched from the series mode to the parallel mode.

Embodiment 4 of a Power Supply System

The controller obtains a voltage of the first battery 601a and a voltage of the second battery 601b through ADC sampling. When the controller determines that the voltage V1 of the first battery 601a is greater than the voltage V2 of the second battery 601b, the controller first controls the second switching transistor Q2 to be disconnected, controls, after second preset time, the first switching transistor Q1 to be closed, controls, after balance time (Balance time), the third switching transistor Q3 to be closed, and controls, after third preset time, the bypass circuit 602 to work and the voltage step-down circuit 603 to stop working. The second preset time may be dead time. For specific descriptions of the dead time and the third preset time, refer to the foregoing embodiment of the power supply system. Details are not described herein again in this embodiment.

The balance time (Balance time) may be referred to as fourth preset time, and is time of voltage balancing between the batteries in a process in which the battery pack is switched from the series mode to the parallel mode. FIG. 7 is still used as an example. The balance time is determined by a voltage difference between the first battery 601a and the second battery 601b, internal resistance of the first battery 601a, and internal resistance of the second battery 601b. A larger voltage difference between the batteries and larger internal resistance of the batteries lead to longer required balance time. If there is no voltage difference between the two batteries, the balance time may be not required. For example, when the battery voltage of the first battery 601a and the battery voltage of the second battery 601b are respectively 4.1V and 4.0 V, and internal resistance of each battery is 260 mΩ, the balance time is greater than or equal to 10 µs, to reduce a surge current between the batteries to less than 0.5 A. When determining that the voltage V1 of the first battery 601a is less than the voltage V2 of the second battery 601b, the controller first controls the second switching transistor Q2 to be disconnected, and after second preset time, the controller controls the third switching transistor Q3 to be closed, and after fourth preset time, the controller controls the first switching transistor Q1 to be closed, and after third preset time, the controller controls the bypass circuit 602 to work and the voltage step-down circuit 603 to stop working.

When determining that the voltage V1 of the first battery 601a is equal to the voltage V2 of the second battery 601b, the controller first controls the second switching transistor Q2 to be disconnected, and after second preset time, the controller controls the first switching transistor Q1 and the third switching transistor Q3 to be closed, and after third preset time, the controller controls the bypass circuit 602 to work and the voltage step-down circuit 603 to stop working.

When determining that the voltage V1 of the first battery 601a is greater than the voltage V2 of the second battery 601b, the controller first controls the second switching transistor Q2 to be disconnected, and after second preset time, the controller controls the first switching transistor Q1 to be closed, and after fourth preset time, the controller controls the third switching transistor Q3 to be closed, and after third preset time, the controller controls the bypass circuit 602 to work and the voltage step-down circuit 603 to stop working.

A control principle of the controller is described below by using an example in which the battery voltage V2 of the second battery 601b in the battery pack 601 is greater than the battery voltage V1 of the first battery 601a. For a case in which the battery voltage V2 of the second battery 601b is less than the battery voltage V1 of the first battery 601a, the controller has a similar control principle, and details are not described herein again.

Figure 20:
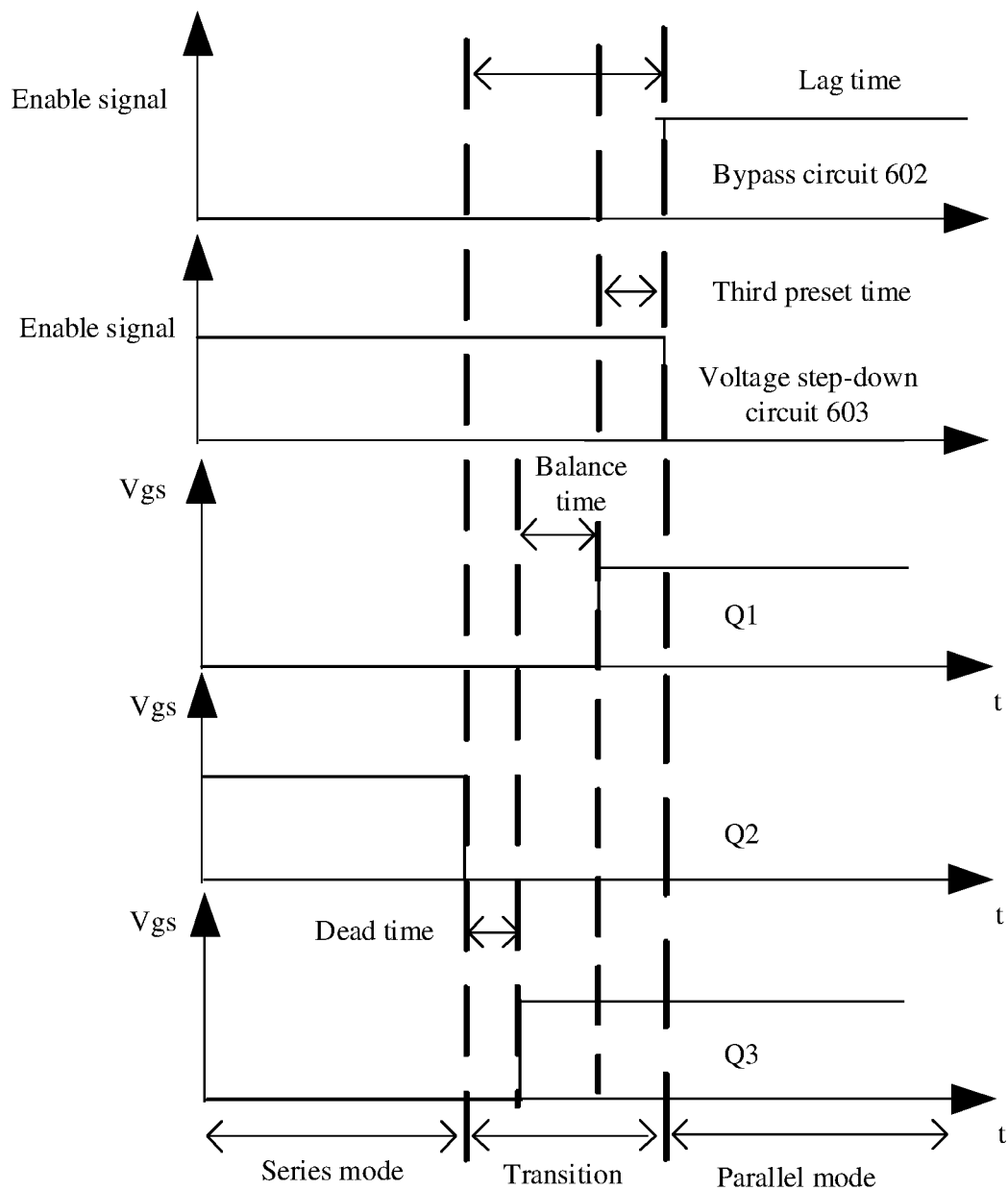
FIG. 20 is a diagram of another control sequence of switching from a series mode to a parallel mode according to an embodiment of this application.

FIG. 20 is a diagram of another control sequence of switching from a series mode to a parallel mode according to an embodiment of this application.

The controller first controls the second switching transistor Q2 to be disconnected, and controls, after dead time, the third switching transistor Q3 to be closed. In this case, the second battery 601b with a relatively high voltage is connected to a circuit first to supply power. After balance time, the controller controls the first switching transistor Q1 to be closed. In this case, the first battery 601b with a relatively low voltage is connected to the circuit later to supply power. Because the battery with a high voltage is switched first to supply power, and the battery with a low voltage is switched later to supply power, a voltage difference between the batteries is reduced, and therefore a surge current between the batteries is reduced. After third preset time, the bypass circuit 602 is controlled to work, and the voltage step-down circuit 603 is controlled to stop working. In this case, the batteries are switched from the series mode to the parallel mode.

A MOS transistor in the battery pack may be in an on/off state, in other words, the switching transistor has two states: on and off, or may be in a linear state, in other words, the MOS transistor is in a linear region, and a working status of the MOS transistor changes linearly instead of instantaneously, to further reduce the surge current. Specific descriptions are provided below with reference to the accompanying drawings.

Figure 21:
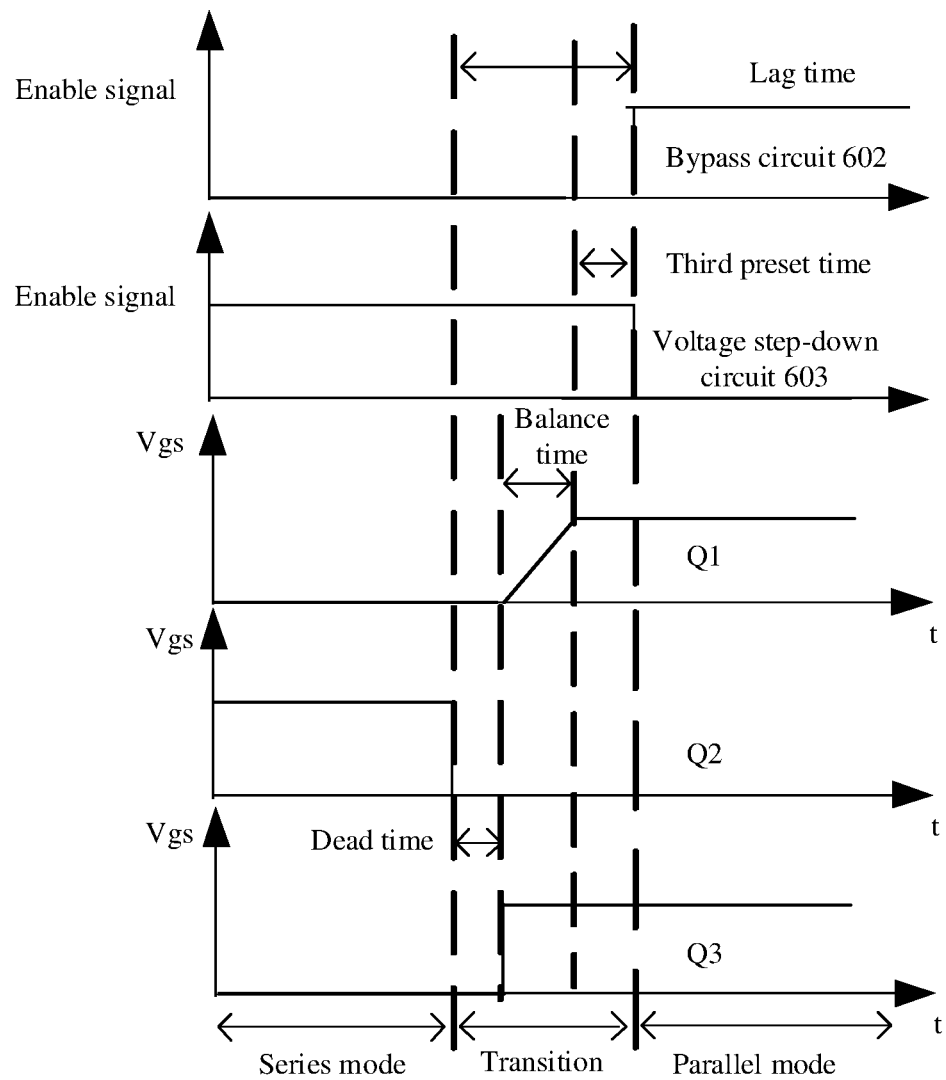
FIG. 21 is a diagram of still another control sequence of switching from a series mode to a parallel mode according to an embodiment of this application.

FIG. 21 is a diagram of still another control sequence of switching from a series mode to a parallel mode according to an embodiment of this application.

When the first switching transistor Q1 works in a linear region, the first switching transistor Q1 is gradually switched from a disconnected state to a closed state in balance time, so that a surge current between batteries is reduced. Specific descriptions are provided below with reference to a simulated diagram.

Figure 22:
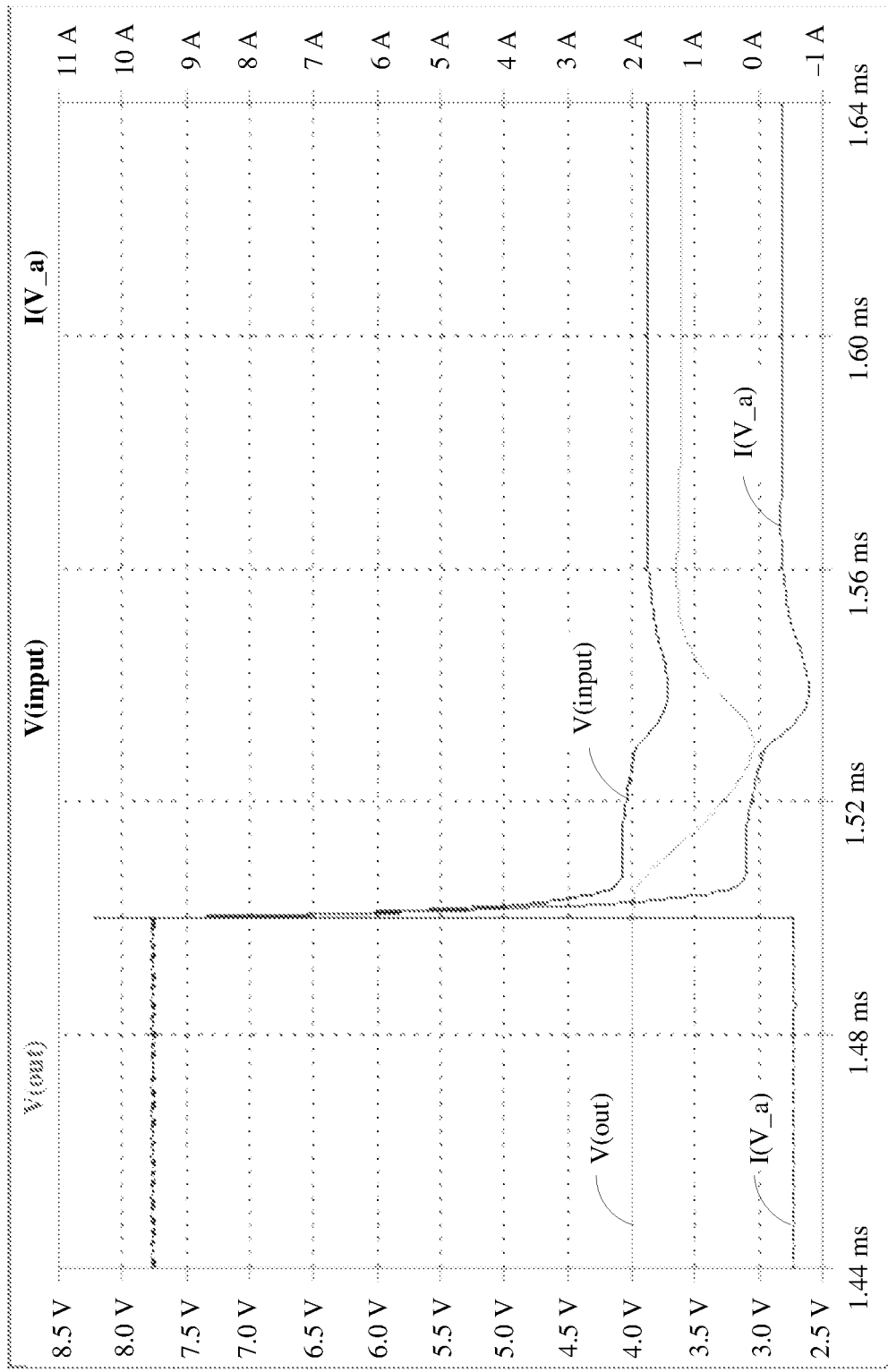
FIG. 22 is a simulated diagram of switching with no balance time according to an embodiment of this application.

FIG. 22 is a simulated diagram of switching without balance time according to an embodiment of this application.

It can be learned by observing a curve of I(V_a) in the figure that in a process of switching from the series mode to the parallel mode, if there is a voltage difference between batteries, a surge current between the batteries can reach a magnitude of approximately 10 A (in other words, a sharp peak appears in a dark gray line in the figure). Consequently, the batteries are damaged.

Figure 23:
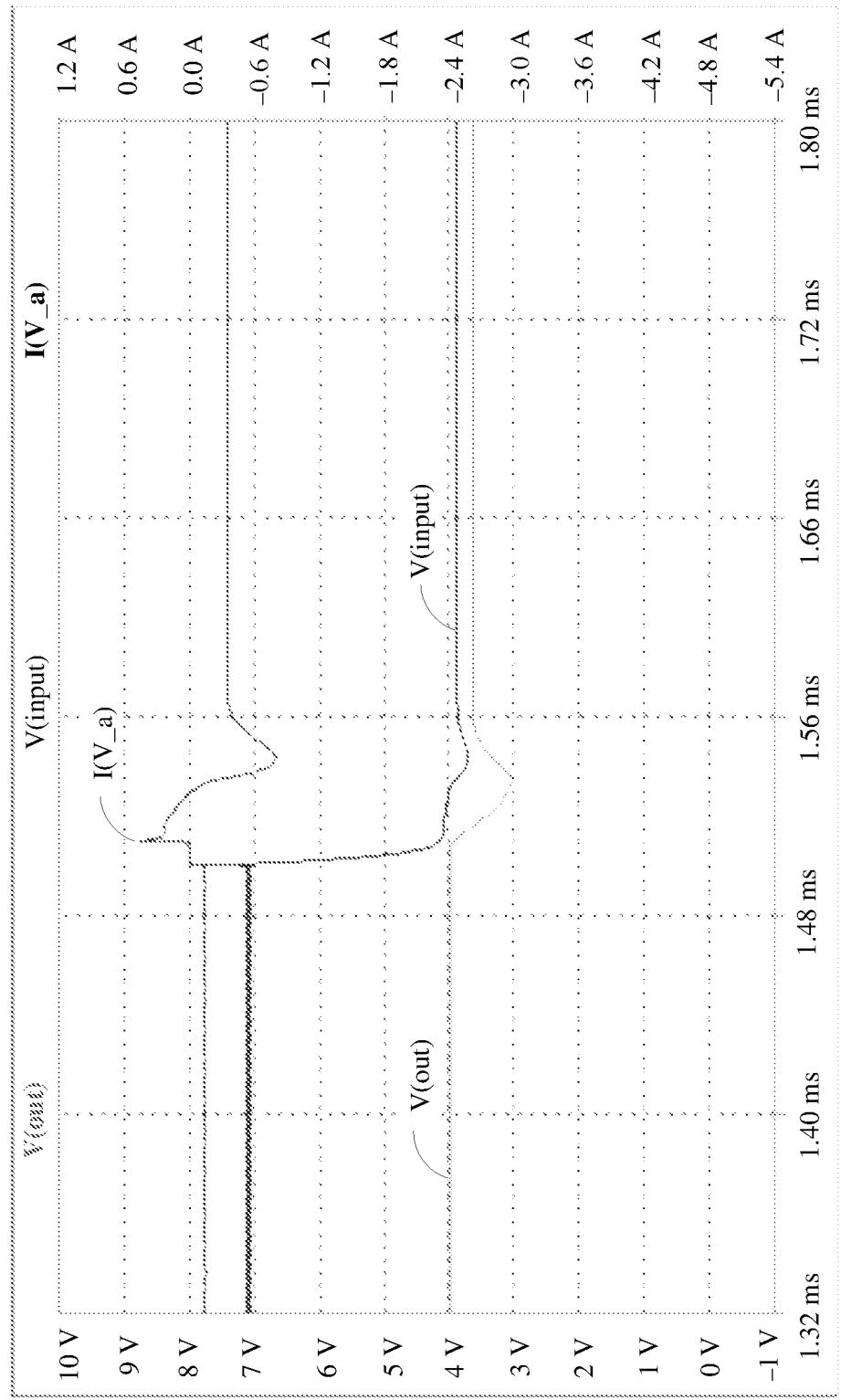
FIG. 23 is a simulated diagram of switching with balance time according to an embodiment of this application.

FIG. 23 is a simulated diagram of switching with balance time according to an embodiment of this application.

It can be learned by observing a curve of I(V_a) in the figure that, after the balance time is set, in a process of switching from the series mode to the parallel mode, a magnitude of a surge current is approximately 0.5 A (in other words, a peak of a dark gray line in the figure obviously decreases), and an effect of reducing the surge current is obvious, so that the battery can be effectively protected.

A working principle in which the controller controls the batteries to switch a mode is described in the foregoing system embodiment. When the controller controls the batteries to be switched from the series mode to the parallel mode, the bypass circuit is controlled to work, and the voltage step-down circuit is controlled to stop working. When the controller controls the batteries to be switched from the parallel mode to the series mode, the voltage step-down circuit is controlled to work, and the bypass circuit is controlled to stop working. An embodiment of this application further provides another control solution for the voltage step-down circuit and the bypass circuit, so that a control signal and a control procedure can be simplified. Specific descriptions are provided below with reference to the accompanying drawings.

Embodiment 5 of a Power Supply System

An output voltage of the battery pack is collected by using an ADC (Analog-to-Digital Converter, analog-to-digital converter), and is sent to the controller. When the controller determines that the output voltage of the battery pack is greater than a first preset threshold voltage, the controller determines that the voltage step-down circuit works and the bypass circuit does not work in this case. When the controller determines that the output voltage of the battery pack is less than or equal to the first preset threshold voltage, the controller determines that the bypass circuit works and the voltage step-down circuit does not work in this case. In this way, the bypass circuit and the voltage step-down circuit are automatically switched. The following provides specific descriptions with reference to the accompanying drawing.

Figure 24:
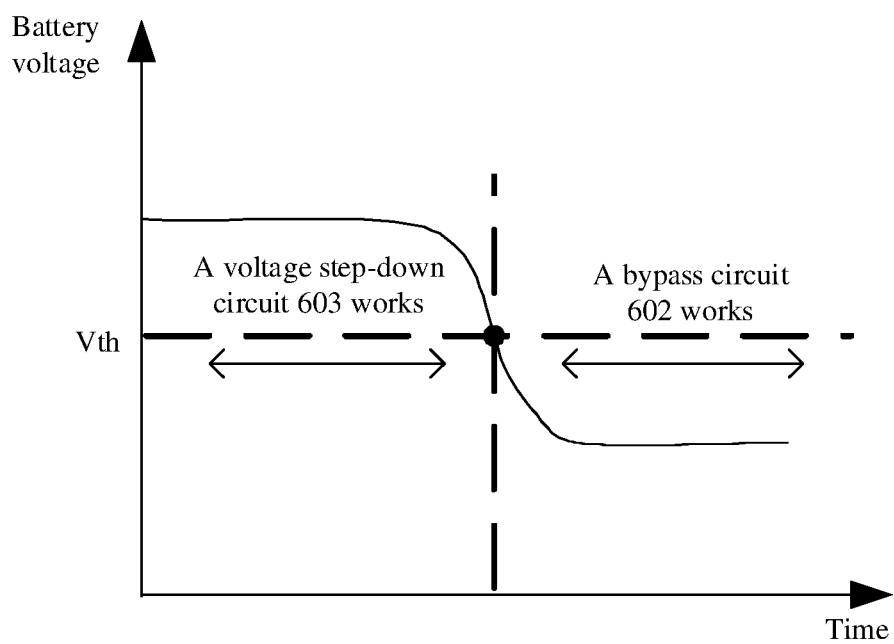
FIG. 24 is a schematic diagram of automatic control of a battery working mode according to an embodiment of this application.

FIG. 24 is a schematic diagram of automatic control of a battery working mode according to an embodiment of this application.

The first preset threshold voltage is represented by Vth. When the output voltage of the battery pack is less than Vth, the controller controls the bypass circuit 602 to be enabled and the control the voltage step-down circuit 603 to be disabled.

When the output voltage of the battery pack is greater than Vth, the controller controls the bypass circuit 602 to be disabled and the voltage step-down circuit 603 to be enabled.

The first preset threshold voltage is greater than a maximum output voltage of the battery pack in the parallel mode and less than a minimum output voltage of the battery pack in the series mode.

For example, when the batteries are in the parallel mode, the maximum output voltage of the battery pack is approximately 4.2 V to 4.3 V. When the batteries are in the series mode, a minimum output voltage of the battery pack is approximately 7.2 V; in other words, the first battery 601a and the second battery 601b are connected in series, and an output voltage of each battery is approximately 3.6 V. A value of the first preset threshold voltage Vth may be greater than a maximum output voltage in a parallel connection, and is less than a minimum output voltage in a serial connection, in other words, the value meets: 7.2 V>Vth>4.3 V, for example, Vth may be 4.5 V. The foregoing values are merely examples for description. Different terminal devices may correspond to different battery parameters. The value of Vth is not specifically limited in this application.

Further, to avoid a case in which glitch or voltage oscillation exists for the output voltage of the battery pack due to interference and consequently enabling of the bypass circuit and enabling of the voltage step-down circuit are frequently switched, a hysteresis control manner is further provided below. For example, when the output voltage of the battery pack is close to a first preset threshold voltage Vth1, voltage glitch may exist when an ADC measures the output voltage of the battery pack. In other words, there is oscillation of the voltage due to interference. Consequently, a magnitude relationship between the output voltage of the battery pack and the first preset threshold voltage Vth1 changes repeatedly, and consequently, the controller repeatedly switches enabling of the bypass circuit and enabling of the voltage step-down circuit. Therefore, a hysteresis voltage interval is added to reduce impact exerted by this problem on the power supply system.

Figure 25:
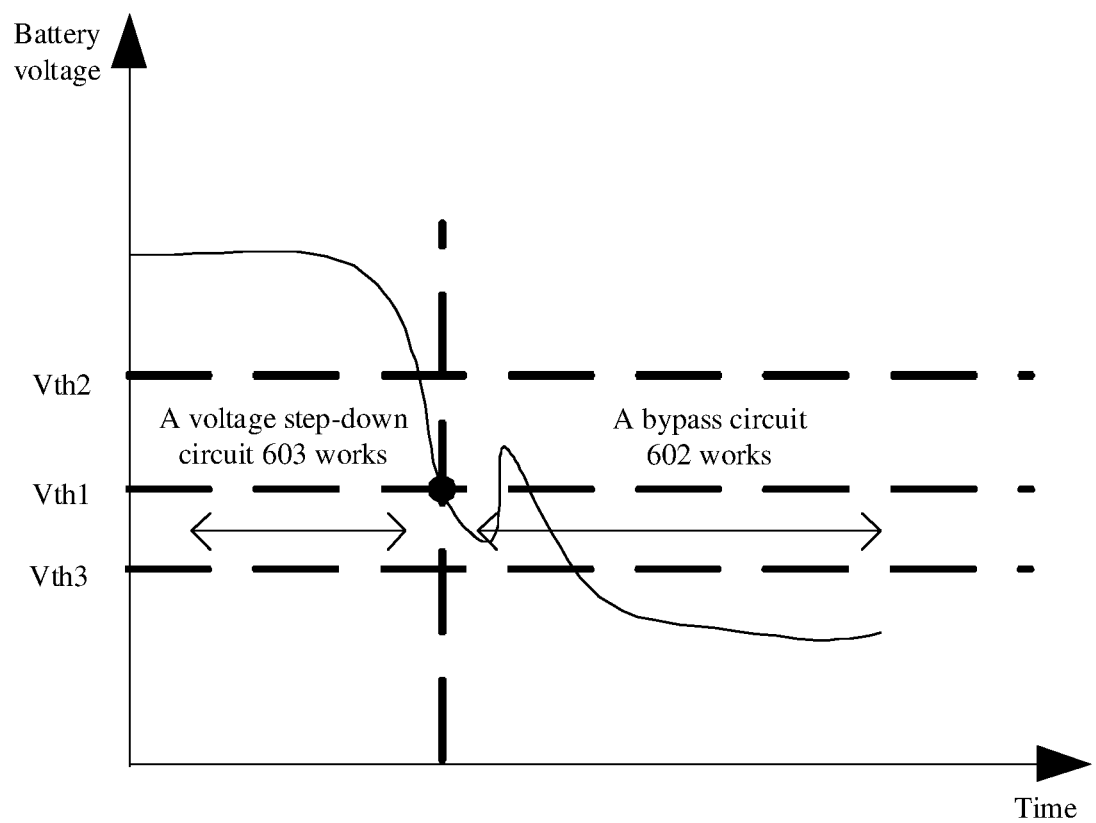
FIG. 25 is a schematic diagram of automatic control of another battery working mode according to an embodiment of this application.

FIG. 25 is a schematic diagram of automatic control of another type of enabling of a bypass circuit and a voltage step-down circuit according to an embodiment of this application.

Vth1 represents the first preset threshold voltage in FIG. 24, and the hysteresis voltage interval is Vth3 to Vth2. Vth2 is greater than Vth1, and Vth1 is greater than Vth3; in other words, Vth2>Vth1>Vth3. Vth2 and Vth3 may be set based on an actual situation. Vth2 needs to be greater than a maximum value of the voltage glitch, and Vth3 needs to be less than a minimum value of the voltage glitch, to suppress impact from the voltage glitch in a switching process. In other words, the hysteresis voltage interval may include a voltage range of the voltage glitch. The range may be determined through experimental measurement in advance. For example, working modes of the voltage step-down circuit and the bypass circuit may be repeatedly switched when the output voltage of the battery pack is Vth1, to obtain the voltage range of the voltage glitch.

In this embodiment, a relationship between the output voltage and Vth1 does not need to be determined through comparison, but whether the output voltage is greater than Vth2 or less than Vth3 may be directly determined through comparison.

The controller determines a magnitude relationship between the output voltage of the battery pack and Vth2. When the output voltage of the battery pack is less than Vth2, the controller determines that the output voltage of the battery pack is affected by the voltage glitch, and keeps current enabling of the bypass circuit and the voltage step-down circuit unchanged.

The controller determines a magnitude relationship between the output voltage of the battery pack and Vth3. When the output voltage of the battery pack is greater than Vth3, the controller determines that the output voltage of the battery pack is affected by the voltage glitch, and keeps current enabling of the bypass circuit and the voltage step-down circuit unchanged.

The hysteresis voltage interval is added, so that impact from the voltage glitch when the ADC detects the output voltage of the battery pack can be reduced. In addition, de-jitter time control may be further added to reduce impact from the voltage glitch. For example, mode switching is not performed again within preset time after the controller first acknowledges mode switching of the batteries. This embodiment of this application sets no specific limitation on a length of the preset time.

The controller in this embodiment compares the output voltage of the battery pack with the first preset threshold voltage, to determine the working statuses of the bypass circuit and the voltage step-down circuit, so that the working statuses of the bypass circuit and the voltage step-down circuit are switched in a timely manner after the working mode of the battery pack is switched, and the control signal and the control procedure are simplified.

Chip Embodiment 1

The voltage step-down circuit and the bypass circuit in the foregoing embodiments may respectively belong to two different chips. An embodiment of this application further provides a chip, and the chip includes both the voltage step-down circuit and the bypass circuit. Specific descriptions are provided below with reference to the accompanying drawings.

Figure 26:
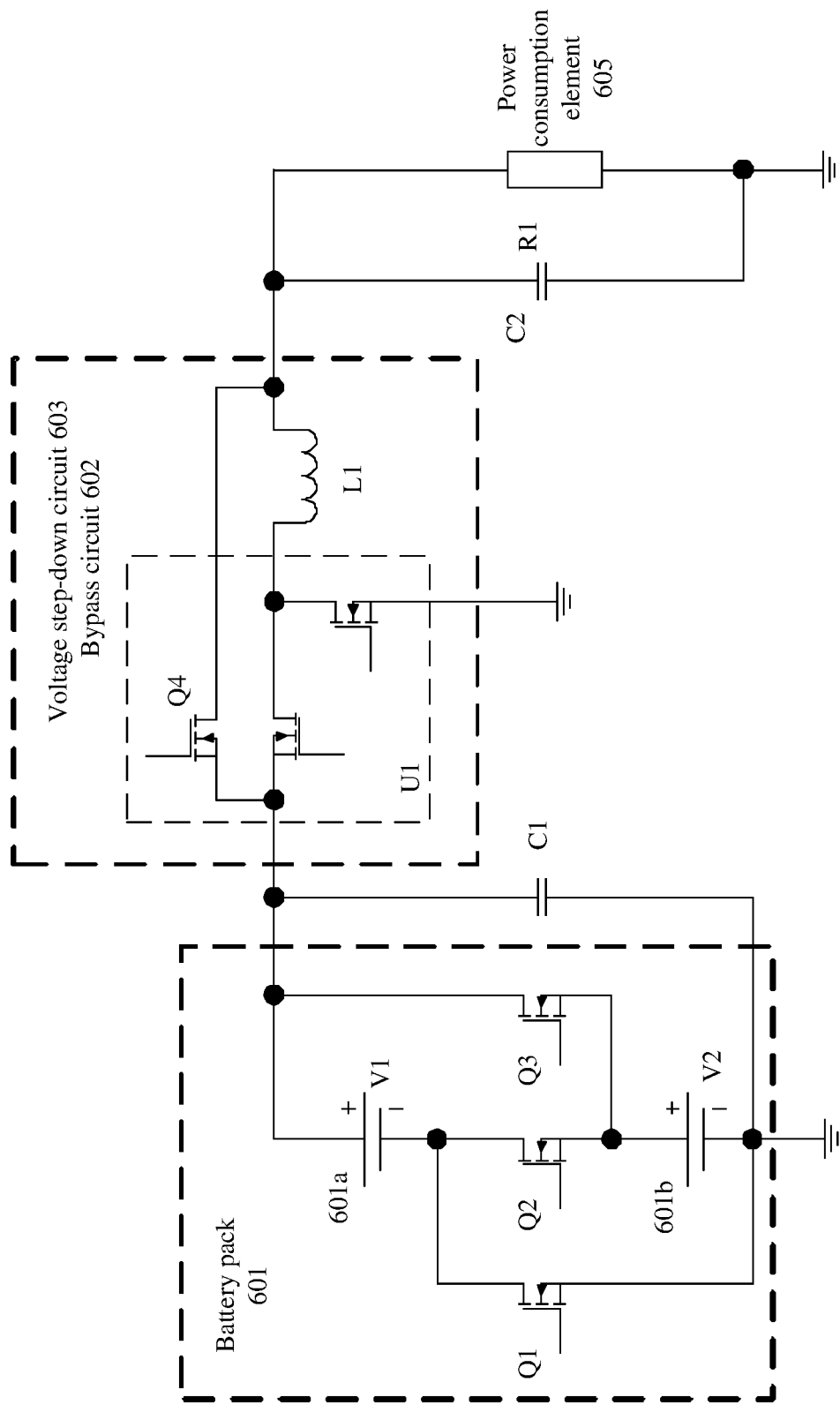
FIG. 26 is a schematic diagram of a chip according to an embodiment of this application.

FIG. 26 is a schematic diagram of a chip according to an embodiment of this application.

The chip includes both a voltage step-down circuit 602 and a bypass circuit 603.

One end of the bypass circuit 602 is connected to an input end of the voltage step-down circuit 603, and the other end of the bypass circuit 602 is connected to an output end of the voltage step-down circuit 603.

Both the bypass circuit 602 and the voltage step-down circuit 603 are connected to a controller of a terminal device, to receive a control signal sent by the controller to switch working statuses. When batteries in a battery pack 601 need to be switched to a series mode, the voltage step-down circuit 603 works, and the bypass circuit 602 stops working. When the batteries in the battery pack 601 are in a parallel mode, the bypass circuit 602 works, and the voltage step-down circuit 603 stops working.

It may be understood that for other descriptions of the controller, the voltage step-down circuit, the bypass circuit, the battery pack, and the like in the chip embodiment, refer to descriptions in another embodiment. Details are not described herein again.

Because the chip includes both the voltage step-down circuit 602 and the bypass circuit 603, when a power supply system uses the chip, a size of a hardware device can be reduced, and costs can be reduced.

Method Embodiment 1

Based on the power supply system for the terminal device provided in the foregoing embodiment, an embodiment of this application further provides a power supply method for a terminal device.

Figure 27:
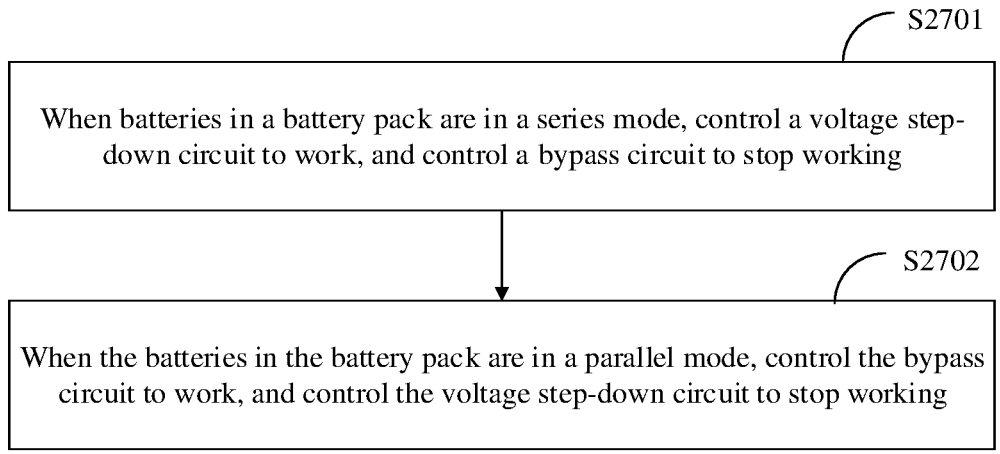
FIG. 27 is a flowchart of a power supply method for a terminal device according to an embodiment of this application.

FIG. 27 is a flowchart of a power supply method for a terminal device according to an embodiment of this application.

The method is applied to a power supply system for the terminal device, and the power supply system includes a battery pack, a bypass circuit, a voltage step-down circuit, and a controller. The battery pack includes at least two batteries. An output end of the battery pack is connected to an input end of the voltage step-down circuit, an output end of the voltage step-down circuit is connected to a power consumption element of the terminal device, and two ends of the bypass circuit are connected to the input end and the output end of the voltage step-down circuit. For a working principle of the power supply system, refer to the foregoing embodiment of the power supply system. Details are not described herein again in this embodiment of this application.

The method includes the following steps.

S2701: When batteries in the battery pack are in a series mode, control the voltage step-down circuit to work, and control the bypass circuit to stop working.

S2702: When the batteries in the battery pack are in a parallel mode, control the bypass circuit to work, and control the voltage step-down circuit to stop working.

Still refer to the power supply system shown in FIG. 7. The following specifically describes a method for determining that a working mode of the batteries in the battery pack needs to be switched.

Method 1: A voltage between two ends of the power consumption element may be determined based on a current output voltage of the battery pack, a current flowing through the power consumption element, and impedance of each circuit component. When it is determined that the voltage between the two ends of the power consumption element is less than a second preset voltage threshold, it is determined that the battery pack needs to be switched from the parallel mode to the series mode. The second preset voltage threshold may be set to a shutdown threshold voltage of the terminal device, for example, the shutdown threshold voltage may be 2.6 V.

A voltage between two ends of a current sense resistor of a discharge path may be measured in real time, and the current that flows through the power consumption element may be determined based on a ratio of the voltage between the two ends of the current sense resistor to impedance of the current sense resistor.

In addition, it may be further determined, based on an output voltage of the battery pack and temperature of the battery pack, that the batteries in the battery pack need to be switched to the series mode. A possible implementation is specifically described below.

Method 2: It is determined, based on the output voltage of the battery pack and the temperature of the battery pack by searching a table, that the batteries in the battery pack need to be switched to the series mode. Specifically, a table corresponding to a load current may be selected based on the load current. When the load current is greater than a preset current, a heavy-load table is correspondingly used, and when the load current is less than or equal to the preset current, a light-load table is correspondingly used.

A voltage between two ends of a current sense resistor of a discharge path may be measured in real time, and a ratio of the voltage between the two ends of the current sense resistor to impedance of the current sense resistor is the load current. The output voltage of the battery pack may be obtained through ADC sampling. In addition, a resistance value of a thermistor is detected to obtain temperature corresponding to the resistance value, to determine current battery temperature. A thermistor of an NTC type may be used in the battery.

In a scenario of low temperature, a low voltage, and heavy load, the series mode is preferentially used, to prevent the device from being abnormally shut down. In a scenario of light load, the parallel mode is preferentially used, to increase standby time of the device.

Method 3: To reduce occupation of storage space of the terminal device, the table in the method 3 may alternatively be replaced with a preset function f. The controller substitutes an output voltage U of the battery pack and battery temperature T into the preset function f to obtain a function value. When the function value is less than or equal to a preset value, it is determined that the batteries in the battery pack need to be switched to the series mode. The function value of the preset function is positively correlated to temperature of the battery pack, and the function value of the preset function is positively correlated to the output voltage of the battery pack.

Further, the preset value is selected based on a magnitude of the load current. When the load current is greater than a preset current, a first preset value is correspondingly used, and when the load current is less than or equal to the preset current, a second preset value is correspondingly used, where the first preset value is less than the second preset value. In other words, a heavy-load scenario corresponds to the first preset value, and a light-load scenario is corresponding to the second preset value.

The preset value represents a threshold voltage for switching between the series mode and the parallel mode at 0° C. For example, the heavy-load scenario corresponds to the first preset value. When a battery voltage is greater than the first preset value, the battery pack needs to be in the parallel mode. When the battery voltage is less than or equal to the first preset value, the series mode is appropriate.

It may be determined, in the foregoing manner, that a working mode of the battery pack needs to be switched. In addition, switching may be performed forcibly by using a control interface of the terminal device. For example, a "low-temperature mode" is added in the control interface of the terminal device. After a user chooses to enter the "low-temperature mode", it is determined that a low-temperature mode button is triggered. In this case, the battery pack needs to be switched to the series mode. When the user exits the "low-temperature mode", the power supply system is switched to an automatic mode, and the controller in the power supply system automatically selects a most appropriate working mode.

For another example, a "low-power mode" may alternatively be added in a control interface of the terminal device. After a user actively chooses to enter the "low-power mode", it is determined that a low-power mode button is triggered, and the battery pack needs to be switched to the series mode in this case. When the user exits the "low-power mode", the power supply system is switched to an automatic mode, and the controller in the power supply system automatically selects a most appropriate working mode.

For specific descriptions of the foregoing methods, refer to Embodiment 2 of a power supply system. Details are not described herein again in this embodiment.

In the power supply method for the terminal device provided in this embodiment of this application, when the batteries in the battery pack are in the series mode, the voltage step-down circuit is controlled to work, and the bypass circuit is controlled to stop working, and when the batteries in the battery pack are in the parallel mode, the bypass circuit is controlled to work, and the voltage step-down circuit is controlled to stop working. Therefore, the batteries in the battery pack can be controlled to be switched between the series mode and the parallel mode, and the batteries in the battery pack are controlled to be switched from the parallel mode to the series mode in a scenario of relatively low ambient temperature (for example, outdoor in winter), a relatively low battery level of the battery pack, and heavy load, so that a probability of abnormal shutdown of the terminal device can be significantly reduced, stability when the terminal device is applied to the foregoing scenario is improved, and therefore user experience in the foregoing scenario is improved. In a scenario in which ambient temperature is relatively normal, the battery pack is fully charged, and load is light, the batteries in the battery pack are controlled to be switched from the series mode to the parallel mode, to improve discharge efficiency of the battery pack, and prolong standby time of the terminal device, so that user experience in the foregoing scenario is improved.

Method Embodiment 2

Further, an embodiment of this application further provides another power supply method for a terminal device, so that a battery pack can be smoothly switched between a series mode and a parallel mode, to reduce impact exerted by a switching process on an output voltage of a power supply system, thereby improving stability of the terminal device. Specific descriptions are provided below by using an example in which the method is applied to the power supply system shown in FIG. 7.

A power supply method when the battery pack is switched from the parallel mode to the series mode is first described below.

Figure 28:
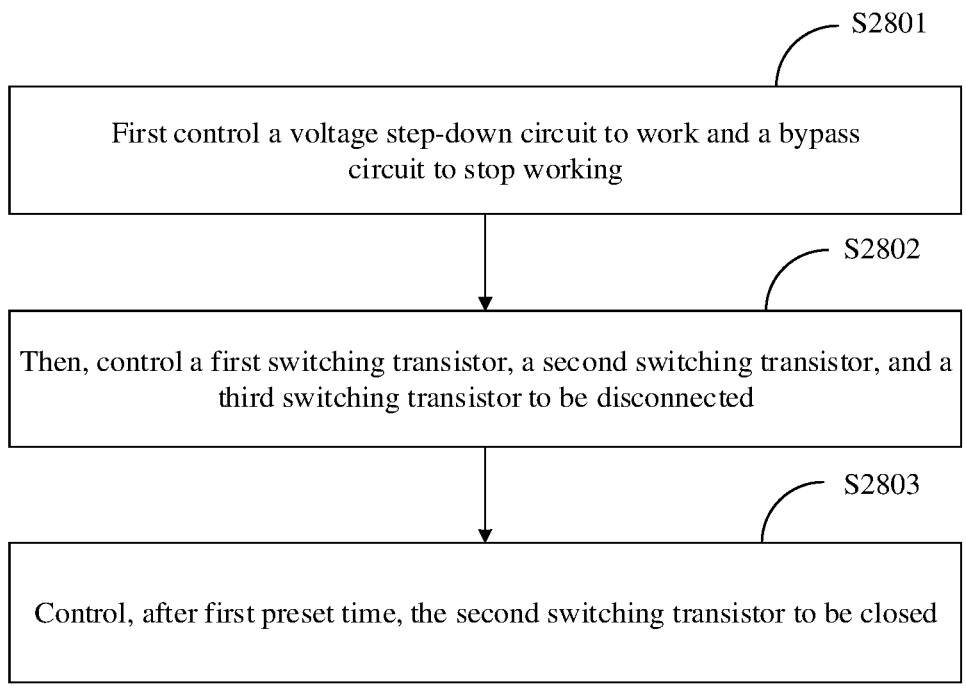
FIG. 28 is a flowchart of a power supply method when a battery pack is switched from a parallel mode to a series mode according to an embodiment of this application.

FIG. 28 is a flowchart of a power supply method when a battery pack is switched from a parallel mode to a series mode according to an embodiment of this application.

The method includes the following steps.

S2801: First control a voltage step-down circuit to work and a bypass circuit to stop working.

Still refer to FIG. 7. To prevent a relatively high voltage output after batteries are directly connected in series from directly exerting impact on a next circuit, the voltage step-down circuit and the bypass circuit need to be switched before statuses of switching transistors Q1, Q2, and Q3 are switched.

S2802: Then, control a first switching transistor, a second switching transistor, and a third switching transistor to be disconnected.

S2803: Control, after first preset time, the second switching transistor to be closed.

To avoid a short circuit between a positive electrode and a negative electrode of a battery cell in a process of switching a working mode of the battery pack, the switching transistors in the battery pack are not simultaneously switched, but the first switching transistor Q1 and the third switching transistor Q3 are first controlled to be disconnected, and after the first preset time, the second switching transistor Q2 is controlled to be closed. The first preset time may be dead time of an NMOS transistor. For specific descriptions of the dead time, refer to the foregoing system embodiment 2. Details are not described herein again in this embodiment.

In the method, the bypass circuit and the voltage step-down circuit are smoothly switched in a process of switching batteries from the parallel mode to the series mode, so that a voltage impact exerted by a relatively high output voltage generated after the batteries are connected in series on a next circuit is reduced, and stability of the terminal device is therefore improved.

A power supply method when the battery pack is switched from the series mode to the parallel mode is described below.

Figure 29:
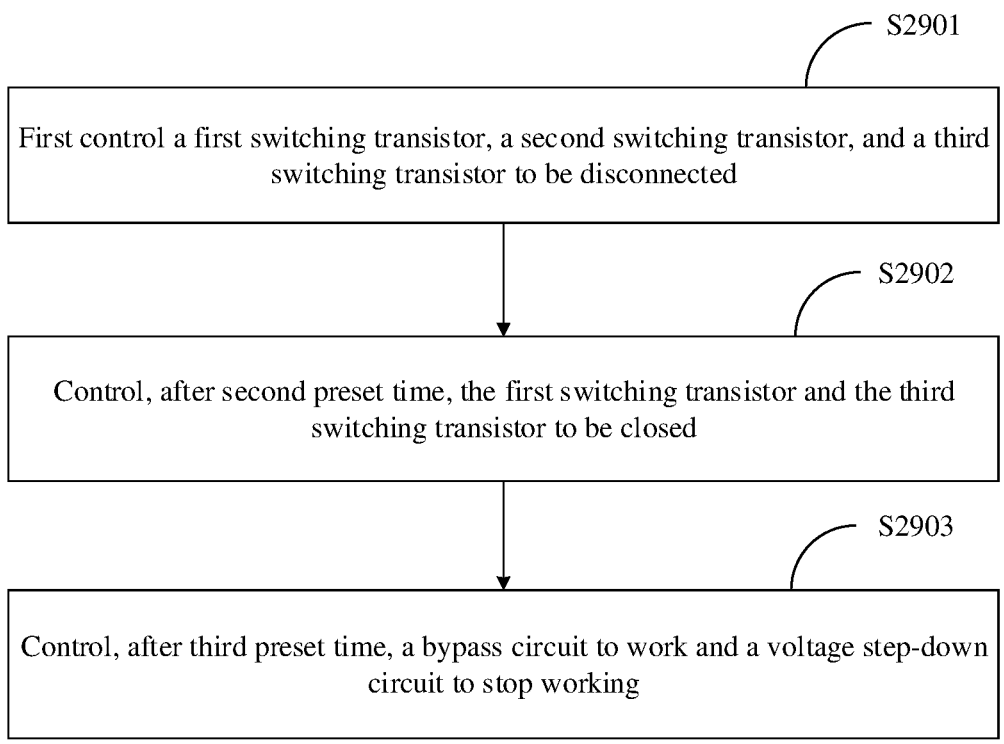
FIG. 29 is a flowchart of a power supply method when a battery pack is switched from a series mode to a parallel mode according to an embodiment of this application.

FIG. 29 is a flowchart of a power supply method when a battery pack is switched from a series mode to a parallel mode according to an embodiment of this application.

The method includes the following steps.

S2901: First control a first switching transistor, a second switching transistor, and a third switching transistor to be disconnected.

To prevent a relatively high voltage output by batteries connected in series from directly exerting impact on a next circuit in a switching process, the voltage step-down circuit and the bypass circuit need to be switched after statuses of switching transistor Q1, Q2, and Q3 are switched.

S2902: Control, after second preset time, the first switching transistor and the third switching transistor to be closed.

The second preset time may be dead time of an NMOS transistor. For specific descriptions of the dead time, refer to the foregoing system embodiment 2. Details are not described herein again in this embodiment.

When the batteries are in a series mode, due to a capacity difference or a self-discharge rate difference between the batteries, voltages of the batteries are different. In this case, if the batteries are directly switched to a parallel mode, a surge current between the batteries is excessively large, and consequently, an electrochemical cell is damaged. To alleviate the surge current, a battery with a relatively high voltage can be first connected to a circuit to supply power. After balance time, a controller controls a battery with a relatively low voltage to be connected to the circuit to supply power. Because the battery with a high voltage is switched first to supply power, and the battery with a low voltage is switched later to supply power, a voltage difference between the batteries is reduced, and therefore a surge current between the batteries is reduced.

The balance time may also be referred to as fourth preset time, and the balance time is determined by a voltage difference between the batteries and internal resistance of each battery. A larger voltage difference between the batteries and larger internal resistance of the batteries lead to longer required balance time. If there is no voltage difference between the two batteries, the balance time is not required.

Therefore, the controlling, after second preset time, the first switching transistor and the third switching transistor to be closed is specifically:

when it is determined that a voltage of a first battery is greater than a voltage of a second battery, first controlling, after the second preset time, the first switching transistor to be closed, and controlling, after fourth preset time, the third switching transistor to be closed; or when it is determined that a voltage of a first battery is less than a voltage of a second battery, first controlling, after the second preset time, the third switching transistor to be closed, and controlling, after fourth preset time, the first switching transistor to be closed; or when it is determined that a voltage of a first battery is equal to a voltage of a second battery, and there is no voltage difference between the two batteries in this case, controlling, after the second preset time, the first switching transistor and the third switching transistor to be simultaneously closed.

S2903: Control, after third preset time, a bypass circuit to work and a voltage step-down circuit to stop working.

To avoid a short circuit between a positive electrode and a negative electrode of the battery in a switching process, switching transistors in a battery pack are not simultaneously switched, but the second switching transistor Q2 is first controlled to be disconnected, and after the second preset time, the first switching transistor Q1 and the third switching transistor Q3 are controlled to be closed, and after the third preset time, the bypass circuit is controlled to work and the voltage step-down circuit is controlled to stop working. A sum of the dead time and the third preset time is lag time.

The third preset time needs to be greater than dead time of an NMOS transistor, to ensure that when the controller controls switching of the voltage step-down circuit 603 and the bypass circuit 602, the first switching transistor Q1 and the third switching transistor Q3 are already in an on state.

In the power supply method, the bypass circuit and the voltage step-down circuit can be smoothly switched in a process of switching the batteries from the parallel mode to the series mode, so that current impact between the batteries in the switching process is further reduced, and the batteries are provided.

Embodiment 1 of a Terminal Device

Based on the power supply system for the terminal device provided in the foregoing embodiment, an embodiment of this application further provides a terminal device. Specific descriptions are provided below with reference to the accompanying drawings.

Figure 30:
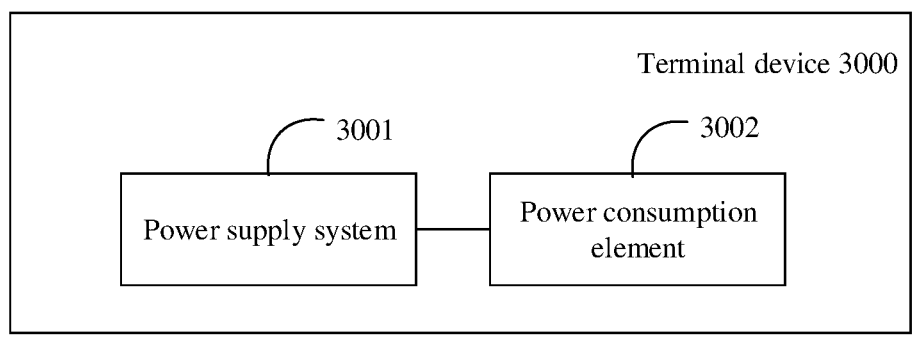
FIG. 30 is a schematic diagram of a terminal device according to an embodiment of this application.

FIG. 30 is a schematic diagram of a terminal device according to an embodiment of this application.

A terminal device 3000 includes a power supply system 3001 and a power consumption element 3002. The power supply system 3001 includes a battery pack, a bypass circuit, a voltage step-down circuit, and a controller. The battery pack includes at least two batteries. An output end of the battery pack is connected to an input end of the voltage step-down circuit, an output end of the voltage step-down circuit is connected to a power consumption element of the terminal device, and two ends of the bypass circuit are connected to the input end and the output end of the voltage step-down circuit.

For a working principle of the power supply system, refer to the foregoing embodiments of a terminal system. Details are not described herein again in this embodiment.

A power supply system for the terminal device includes a controller. When batteries in a battery pack are in a series mode, the controller controls the voltage step-down circuit to work, and controls the bypass circuit to stop working. When the batteries in the battery pack are in a parallel mode, the controller can further control the bypass circuit to work, and control the voltage step-down circuit to stop working. The controller can control the batteries in the battery pack to be switched between the series mode and the parallel mode. In addition, the controller can control, in a scenario such as relatively low ambient temperature (for example, outdoor in winter), a relatively low battery level of the battery pack, and heavy load, the batteries in the battery pack to be switched from the parallel mode to the series mode. This can significantly reduce a probability of abnormal shutdown of the terminal device, and improve stability of the terminal device when the terminal device is applied in the foregoing scenario, so that user experience in the foregoing scenario is improved. In a scenario in which ambient temperature is relatively normal, the battery pack is fully charged, and load is light, the batteries in the battery pack are controlled to be switched from the series mode to the parallel mode, to improve discharge efficiency of the battery pack, and prolong standby time of the terminal device, so that user experience in the foregoing scenario is improved.

A type and an application scenario of the terminal device are not specifically limited in this embodiment of this application, and the terminal device may be a foldable phone, or may be another terminal device with a battery.

It should be understood that, in the embodiments of this application, "at least one (item)" means one or more, "a plurality of" means two or more, and "and/or" indicates that three relationships may exist. For example, "A and/or B" may indicate three cases: only A exists, only B exists, and both A and B exist, where A and B may be singular or plural numbers.

The foregoing descriptions are merely examples of embodiments of the present invention, but are not intended to limit any form of the present invention. Although the examples of the embodiments of the present invention are disclosed above, the embodiments are not intended to limit the present invention. By using the method and the technical content disclosed above, any person of ordinary skill in the art can make a plurality of possible changes and modifications on the technical solutions of the present invention, or amend the technical solutions thereof to be embodiments with equal effects through equivalent variations without departing from the protection scope of the technical solutions of the present invention. Therefore, any simple modification, equivalent change, and modification made to the foregoing embodiments based on technical essence of the present invention without departing from content of the technical solutions of the present invention still fall within the protection scope of the technical solutions of the present invention.

What is claimed is:

1. A power supply system, comprising a battery pack, a bypass circuit, a voltage step-down circuit, and a controller, the battery pack comprising at least two batteries;
   wherein an output end of the battery pack is connected to an input end of the voltage step-down circuit, an output end of the voltage step-down circuit is connected to a power consumption element of a terminal device, one end of the bypass circuit is connected to the input end of the voltage step-down circuit, and the other end of the bypass circuit is connected to the output end of the voltage step-down circuit; and
   wherein the controller is configured to:
      when determining to switch the at least two batteries in the battery pack to operate in a series mode, control the voltage step-down circuit to operate and control the bypass circuit to stop operating, to switch the at least two batteries in the battery pack to operate in the series mode, and when determining to switch the at least two batteries in the battery pack to operate in a parallel mode, control the bypass circuit to operate and control the voltage step-down circuit to stop operating, to switch the at least two batteries in the battery pack to operate in the parallel mode; and
      wherein the controller is configured to determine to switch the at least two batteries in the battery pack to operate in the series mode when the controller determines that an output voltage of the battery pack is greater than or equal to a first preset threshold voltage.

2. The power supply system according to claim 1, wherein the controller is further configured to: when determining that a voltage between two ends of the power consumption element is less than a second preset voltage threshold, determine to switch the at least two batteries in the battery pack to the series mode.

3. The power supply system according to claim 1, wherein the controller is further configured to: determine, based on the output voltage of the battery pack and a temperature of the battery pack, to switch the at least two batteries in the battery pack to the series mode.

4. The power supply system according to claim 3, wherein the controller is further configured to search a table, based on the output voltage of the battery pack and the temperature of the battery pack, to determine to switch the at least two batteries in the battery pack to the series mode.

5. The power supply system according to claim 4, wherein the controller is further configured to:
select the table corresponding to a load current, wherein when the load current is greater than a preset current, the table corresponding to the load current is a first table configured for a heavier-load scenario, and when the load current is less than or equal to the preset current, the table corresponding to the load current is a second table configured for a lighter-load scenario.

6. The power supply system according to claim 3, wherein the controller is further configured to:
obtain a value based on the output voltage of the battery pack and the temperature of the battery pack, and when the value is less than or equal to a preset value, determine to switch the at least two batteries in the battery pack to the series mode.

7. The power supply system according to claim 3, wherein the controller is further configured to:
obtain a function value based on the output voltage of the battery pack and the temperature of the battery pack using a preset function; and
when the function value is less than or equal to a preset value, determine to switch the at least two batteries in the battery pack to the series mode, wherein the function value is positively correlated to the temperature of the battery pack and to the output voltage of the battery pack.

8. The power supply system according to claim 1, wherein the controller is further configured to:
when determining that a low-temperature mode button of the terminal device is triggered, determine to switch the at least two batteries in the battery pack to the series mode.

9. The power supply system according to claim 1, wherein the controller is further configured to:
when determining that a battery level of the battery pack is less than a preset battery level, or when determining that a low-power mode button of the terminal device is triggered, determine to switch the at least two batteries in the battery pack to the series mode.

10. The power supply system according to claim 1, wherein the battery pack comprises a first battery and a second battery, and the battery pack further comprises a first switching transistor, a second switching transistor, and a third switching transistor;
wherein a positive electrode of the first battery is connected to the input end of the voltage step-down circuit;
wherein a negative electrode of the first battery is connected to a positive electrode of the second battery through the second switching transistor, and a negative electrode of the second battery is grounded;
wherein one end of the first switching transistor is connected to the negative electrode of the first battery, and another end of the first switching transistor is grounded;
wherein one end of the third switching transistor is connected to the input end of the voltage step-down circuit, and another end of the third switching transistor is connected to the positive electrode of the second battery; and
wherein the controller is further configured to:
when determining to switch the at least two batteries to the series mode, turn off the first switching transistor and the third switching transistor, and turn on the second switching transistor, to switch the at least two batteries in the battery pack to operate in the series mode; and
when determining to switch the at least two batteries to the parallel mode, turn off the second switching transistor, and turn on the first switching transistor and the third switching transistor, to switch the at least two batteries in the battery pack to operate in the parallel mode.

11. The power supply system according to claim 10, further comprising a first capacitor, wherein a first end of the first capacitor is connected to the output end of the battery pack, and a second end of the first capacitor is grounded; and
wherein the controller is further configured to:
when determining to switch the at least two batteries to the series mode, turn off the first switching transistor, the second switching transistor and the third switching transistor, and turn on, after a first preset time, the second switching transistor, to switch the at least two batteries in the battery pack to operate in the series mode.

12. The power supply system according to claim 11, further comprising a second capacitor, wherein a first end of the second capacitor is connected to the output end of the voltage step-down circuit, and a second end of the second capacitor is grounded.

13. The power supply system according to claim 11, wherein the controller is further configured to:
when determining to switch the at least two batteries to the parallel mode, turn off the first switching transistor, the second switching transistor and the third switching transistor, turn on, after a second preset time, the first switching transistor and the third switching transistor, and control, after a third preset time, the bypass circuit to operate and the voltage step-down circuit to stop operating.

14. The power supply system according to claim 13, wherein that the controller controls to turn on, after the second preset time, the first switching transistor and the third switching transistor comprises:
when the controller determines that a voltage of the first battery is greater than a voltage of the second battery, the controller controls to turn on, after the second preset time, the first switching transistor, and to turn on, after fourth preset time, the third switching transistor; or
when the controller determines that a voltage of the first battery is less than a voltage of the second battery, the controller controls to turn on, after the second preset time, the third switching transistor, and to turn on, after the fourth preset time, the first switching transistor; or
when the controller determines that a voltage of the first battery is equal to a voltage of the second battery, the controller controls to turn on, after the second preset time, the first switching transistor and the third switching transistor.

15. A chip, comprising a bypass circuit and a voltage step-down circuit, wherein:
an input end of the voltage step-down circuit is connected to an output end of a battery pack, and an output end of the voltage step-down circuit is connected to a power consumption element;
one end of the bypass circuit is connected to the input end of the voltage step-down circuit, and another end of the bypass circuit is connected to the output end of the voltage step-down circuit; and wherein the voltage step-down circuit is configured to operate and the bypass circuit is configured to stop operating in response to receiving a first control signal, to switch the batteries in the battery pack to a series mode, or the bypass circuit is configured to operate and the voltage step-down circuit is configured to stop operating in response to receiving a second control signal, to switch the batteries in the battery pack to a parallel mode; and wherein the first control signal is received when an output voltage of the battery pack is greater than or equal to a first preset threshold voltage.

16. The chip according to claim 15, wherein the first control signal is further received when a voltage between two ends of the power consumption element is less than a second preset voltage threshold.

17. A power supply method for a terminal device, applied to a power supply system for the terminal device, wherein the power supply system comprises a battery pack, a bypass circuit, a voltage step-down circuit and a controller, and wherein the battery pack comprises at least two batteries, an output end of the battery pack is connected to an input end of the voltage step-down circuit, an output end of the voltage step-down circuit is connected to a power consumption element of the terminal device, one end of the bypass circuit is connected to the input end of the voltage step-down circuit, and another end of the bypass circuit is connected to the output end of the voltage step-down circuit;

the power supply method comprising:
controlling the voltage step-down circuit to operate, and controlling the bypass circuit to stop operating, to switch the at least two batteries in the battery pack to a series mode; or controlling the bypass circuit to operate, and controlling the voltage step-down circuit to stop operating, to switch the at least two batteries in the battery pack to a parallel mode; and wherein controlling the voltage step-down circuit to operate, and controlling the bypass circuit to stop operating, to switch the at least two batteries in the battery pack to the series mode, comprises:
controlling the voltage step-down circuit to operate, and controlling the bypass circuit to stop operating, to switch the at least two batteries in the battery pack to the series mode, when an output voltage of the battery pack is greater than or equal to a first preset threshold voltage.

18. The method according to claim 17, wherein controlling the voltage step-down circuit to operate, and controlling the bypass circuit to stop operating, to switch the at least two batteries in the battery pack to the series mode, comprises:
when a voltage between two ends of the power consumption element is less than a second preset voltage threshold, controlling the voltage step-down circuit to operate, and controlling the bypass circuit to stop operating, to switch the at least two batteries in the battery pack to the series mode.

19. The method according to claim 17, wherein controlling the voltage step-down circuit to operate, and controlling the bypass circuit to stop operating, to switch the at least two batteries in a battery pack to the series mode, comprises:
based on the output voltage of the battery pack and a temperature of the battery pack, controlling the voltage step-down circuit to operate, and controlling the bypass circuit to stop operating, to switch the at least two batteries in the battery pack to the series mode.

\* \* \* \* \*

UNITED STATES PATENT AND TRADEMARK OFFICE
CERTIFICATE OF CORRECTION

PATENT NO. : 12,308,675 B2  
APPLICATION NO. : 17/627483  
DATED : May 20, 2025  
INVENTOR(S) : Sun et al.

Page 1 of 1

It is certified that error appears in the above-identified patent and that said Letters Patent is hereby corrected as shown below:

In the Claims

In Column 42, in Claim 14, Line 47, delete "fourth" and insert -- a fourth --.

Signed and Sealed this  
First Day of July, 2025

Coke Morgan Stewart  
*Acting Director of the United States Patent and Trademark Office*